(12) United States Patent
Deo

(10) Patent No.: US 12,237,864 B2
(45) Date of Patent: Feb. 25, 2025

(54) MULTI-USER WIRELESS DIGITAL COMMUNICATION OVER SOUND WAVE IN AIR BY COUPLING DIRECT SEQUENCE SPREAD SPECTRUM—ORTHOGONAL FREQUENCY DIVISION MULTIPLEXING (DSSS-OFDM) FOR LOW SNR REGIME

(71) Applicant: TRILLBIT, INC., Boston, MA (US)

(72) Inventor: Bashkar Deo, Cambridge, MA (US)

(73) Assignee: TRILLBIT, INC., Boston, MA (US)

( * ) Notice: Subject to any disclaimer, the term of this patent is extended or adjusted under 35 U.S.C. 154(b) by 0 days.

(21) Appl. No.: 18/707,266

(22) PCT Filed: Nov. 23, 2022

(86) PCT No.: PCT/US2022/050933
§ 371 (c)(1),
(2) Date: May 3, 2024

(87) PCT Pub. No.: WO2023/097023
PCT Pub. Date: Jun. 1, 2023

(65) Prior Publication Data
US 2024/0429965 A1    Dec. 26, 2024

Related U.S. Application Data

(60) Provisional application No. 63/283,405, filed on Nov. 26, 2021.

(51) Int. Cl.
*H04B 1/71* (2011.01)
*H04B 1/711* (2011.01)
(Continued)

(52) U.S. Cl.
CPC ............ *H04B 1/711* (2013.01); *H04L 1/0071* (2013.01); *H04L 9/32* (2013.01)

(58) Field of Classification Search
CPC .......... H04B 1/711; H04L 1/0071; H04L 9/32
(Continued)

(56) References Cited

U.S. PATENT DOCUMENTS

| 7,333,528 B1 | 2/2008 | Miao |
| 8,854,985 B2 | 10/2014 | Tsfaty |

(Continued)

FOREIGN PATENT DOCUMENTS

| IN | 202144006910 A | 8/2021 |
| WO | 2020222616 A1 | 11/2020 |

OTHER PUBLICATIONS

Dessalermos, "Adaptive Reception for Underwater Communications," Dissertation, Naval Postgraduate School, Monterey, California, Jun. 2011, 186 pages.

(Continued)

*Primary Examiner* — Emmanuel Bayard
(74) *Attorney, Agent, or Firm* — Vorys, Sater, Seymour, and Pease LLP; Michael Messinger

(57) ABSTRACT

Wireless digital communication of information over sound waves is provided using near near-ultrasonic acoustic (audio)-spectrum. A method includes receiving a modulated data signal generated from coupled direct sequence spread spectrum (DSSS) and orthogonal frequency division multiplexing (OFDM) at a transmitter. The modulated data signal has a phase-shift key (PSK) modulated data signal spread by different Q length chip sequence. The method includes demodulating a synchronized data signal by extracting each OFDM data block having a data symbol and preamble and postamble symbols which were transmitted on an orthogonal sub-carrier with variable Q length chip sequence for multi-user communication over air as a transmission medium. This enables synchronization of communication over the air between transmitters and receivers in multiple user devices (Continued)

in the presence of multiple path propagation and different signal to noise ratios. Simultaneous communication over air between transmitters and receivers in multiple user devices can be done.

8 Claims, 20 Drawing Sheets

(51) Int. Cl.
  *H04L 1/00* (2006.01)
  *H04L 9/32* (2006.01)
(58) Field of Classification Search
  USPC .................................................. 375/139–141
  See application file for complete search history.

(56) References Cited

U.S. PATENT DOCUMENTS

| | | | |
|---|---|---|---|
| 8,934,457 B2 | 1/2015 | Kapoor et al. | |
| 10,491,261 B1* | 11/2019 | Al-Eidan | H04L 27/2003 |
| 11,239,963 B2 | 2/2022 | Melodia et al. | |
| 2014/0036964 A1 | 2/2014 | Asahina | |
| 2015/0282185 A1 | 10/2015 | Nikopour et al. | |
| 2022/0109515 A1 | 4/2022 | Chervyakov et al. | |
| 2024/0015059 A1* | 1/2024 | Balakrishnan | H04L 27/2085 |

OTHER PUBLICATIONS

International Search Report and Written Opinion issued Jun. 16, 2023, for PCT/US2022/050933, 9 pages.
"Terms of Service," VR Chat, Aug. 10, 2022, https://hello.vrchat.com/legal, 28 pages.
Poole, "Modulation basics, part 3: Spread spectrum and OFDM," EE Times, Designlines, Military & Aerospace Designline, https://www.eetimes.com/modulation-basics-part-3-spread-spectrum-and-ofdm/, Jun. 16, 2008, 8 pages.
Huang et al., "The Multicode Interleaved DSSS System for High Speed Wireless Digital Communications," ICC 2001. IEEE International Conference on Communications. Conference Record (Cat. No. 01CH37240), Helsinki, Finland, 2001, pp. 2990-2994, vol. 10.

* cited by examiner

MULTI-USER WIRELESS DIGITAL COMMUNICATION OVER SOUND WAVE IN AIR BY COUPLING DIRECT SEQUENCE SPREAD SPECTRUM—ORTHOGONAL FREQUENCY DIVISION MULTIPLEXING (DSSS-OFDM) FOR LOW SNR REGIME

CROSS-REFERENCE TO RELATED APPLICATIONS

This application claims priority to and the benefit of International Application No. PCT/US2022/050933, titled "MULTI-USER WIRELESS DIGITAL COMMUNICATION OVER SOUND WAVE IN AIR BY COUPLING DIRECT SEQUENCE SPREAD SPECTRUM-ORTHOGONAL FREQUENCY DIVISION MULTIPLEXING (DSSS-OFDM) FOR LOW SNR REGIME." filed Nov. 23, 2022, which claims priority to and the benefit of Provisional Patent Application No. 63/283,405, titled "MULTI USER VARIABLE BIT ENCODING FOR DIGITAL COMMUNICATION IN AIR USING SOUND FOR LOW SNR USING NOVEL COUPLED DS-OFDM", filed Nov. 26, 2021. The entire contents of each of the above identified applications are incorporated herein by reference.

TECHNICAL FIELD

The field relates to wireless digital communication of information over sound waves.

BACKGROUND

A major challenge faced in wireless communication are time varying nature of channels. Frequency selective fading due to multipath propagation can occur which results in inter symbol interference (ISI) where one symbol interferes with subsequent symbols. When a receiver receives multiple copies of transmitted signal at a different time interval as a signal propagates from multiple paths decoding error occurs in the received signal. Doppler frequency shift caused by unpredictable motion of receiver and transmitter or changes in a transmission medium can also occur which leads to a change in received signal frequency in comparison with the frequency of an original sent signal by the transmitter which results in a change in signal characteristics and a lower the Signal to Noise ratio (SNR) higher bit error rate (BER) at the receiver end.

SUMMARY OF INVENTION

The inventor recognized there is a need to achieve bandwidth efficiency and improvements on a multipath signal to achieve lower BER for weaker signals thereby overcoming all the limitations mentioned above. Further, inventor recognized there is a need to identify an unknown time varying channel from pilot symbols in each OFDM block for channel estimation, thereby updating equalizer taps weights for data symbols.

In embodiments, wireless digital communication of information over sound waves is provided in both indoor and outdoor environments using near-ultrasonic acoustic-spectrum converting existing speaker and microphone to data transmitting devices.

Further embodiments, features, and advantages of the invention, as well as the structure and operation of the various embodiments of the invention are described in detail below with reference to accompanying drawings.

BRIEF DESCRIPTION OF THE DRAWINGS

The following figures are included to illustrate certain aspects of the embodiments, and should not be viewed as exclusive embodiments. The subject matter disclosed is capable of considerable modifications, alterations, combinations, and equivalents in form and function, as will occur to those skilled in the art and having the benefit of this disclosure.

DETAILED DESCRIPTION

The examples herein, the various features, and advantageous details thereof are explained more fully with reference to the non-limiting examples that are illustrated in the accompanying drawings and detailed in the following description. Descriptions of well-known components and processing techniques are omitted so as to not unnecessarily obscure the examples herein.

The examples used herein are intended merely to facilitate an understanding of ways in which the examples herein may be practiced and to further enable those of skill in the art to practice the examples herein. Accordingly, the examples should not be construed as limiting the scope of the examples herein.

The present invention relates to wireless digital communication of information over sound, in both indoor and outdoor environments using near-ultrasonic acoustic—spectrum converting existing speakers and microphones to data transmitting devices. More particularly, relates to a transceiver which couples direct sequence spread spectrum (DSSS) with orthogonal frequency division multiplexing (OFDM) in digital communication system for accurate signal retrieval at low SNR regime and in the presence of Doppler frequency shift.

Figure 1:
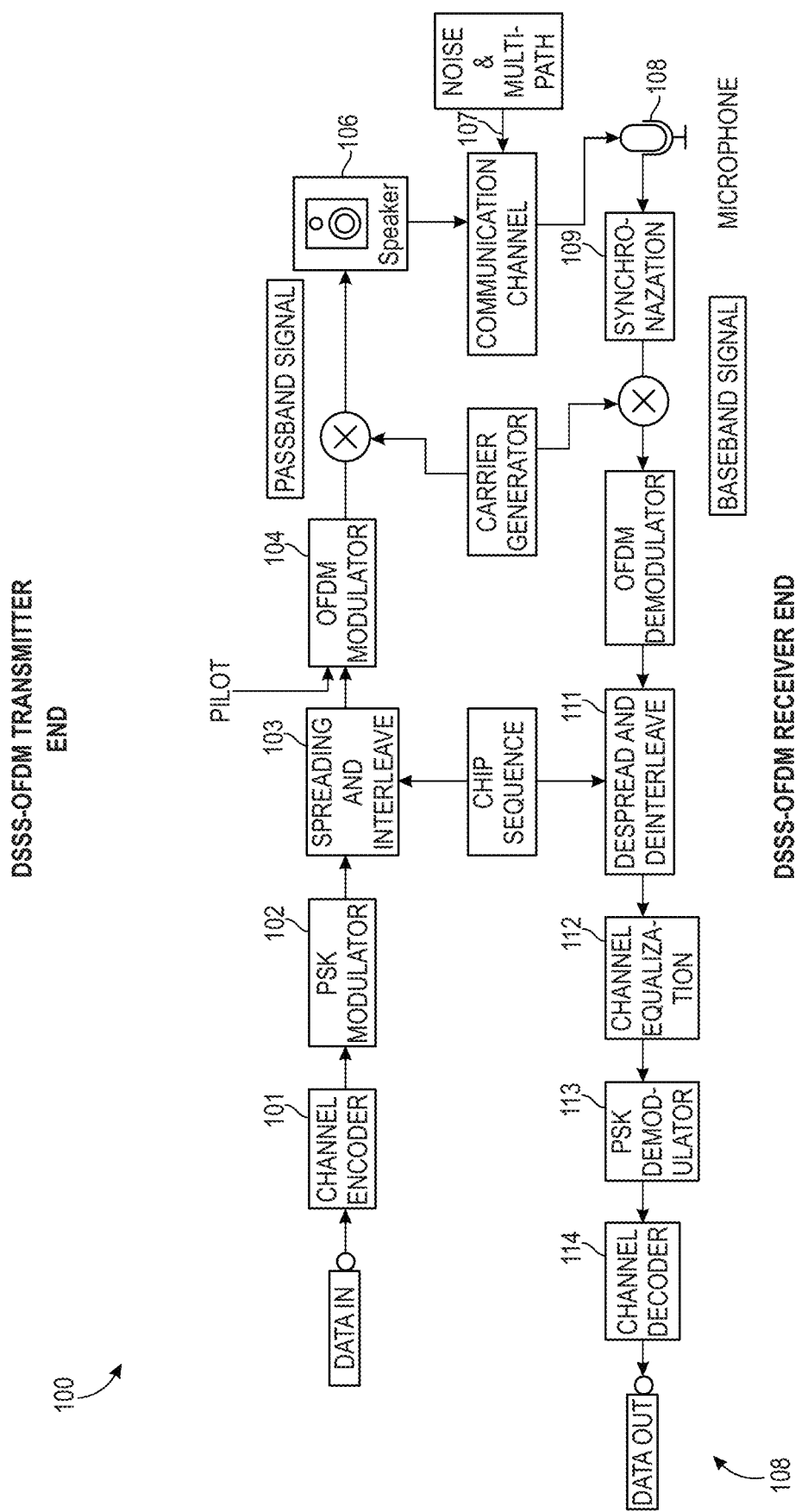
FIG. 1 illustrates a method using a direct sequence spread spectrum-orthogonal frequency division multiplexing (DSSS-OFDM) transmitter and receiver structure according to an example herein.

FIG. 1 illustrates a method 100 performed by a transceiver in a near-ultrasonic acoustic (audio) frequency range of a wireless communication network. The transceiver has a DSSS-OFDM transmitter end that receives input data (Data In) and a DSSS-OFDM receiver end that sends output data (Data Out). The method 100 includes receiving 108 a modulated data signal from a transmitter. The modulated data signal comprises data symbols.

In an embodiment, the method 100 further comprises receiving the electrical data signal (Data In) that needs to be transmitted in sound waves over air. The data symbols are encoded in a channel encoder 101 by adding parity checks using the channel encoder for error-control coding (ECC). Channel encoder 101 uses at least one of the error correction techniques as Convolutional Codes, a Block Codes information, or a Turbo Codes to achieve the ECC.

The method in 100 performs pulse shaping filtering to band limit data symbol. The Pulse shaped symbols are modulated by M-Ary PSK modulator 102 of the transmitter, using at least one of the following M value 4, 8, 16 for obtaining desired data rate. The PSK modulated data symbols are spread and interleaved (103) before transmission over orthogonally spaced sub carrier. Varying chip sequence length ensures multiple user access over available narrow ultrasonic band between transceivers as described in FIG. 2.

In an embodiment, the method 100 further comprises filtering the received data signal using a pulse shaping filter for limiting bandwidth to a specific frequency band. The filtering of the received data signal using a pulse shaping filter further comprises applying an impulse response to the data symbols of the data signals at a predefined signaling interval (Tb). The pulse shaping filter comprises either one of the filter a Raised cosine, a Root-raised-cosine filter, and a Gaussian Pulse shaping filter.

M-Ary PSK modulator 102 of the transmitter modulates data symbols. The spread and interleave method 103 comprises direct sequence spread spectrum (DSSS) which maps the original PSK modulated symbols on Q chip. Each symbol spreading can be done using same chip sequence or different chip sequence based on security level desired, because the received signal can only be decoded with the knowledge of chip sequence encoded at transmission end. The chip sequence can, for example, be Gold Sequence, PN sequence, or Walsh Hadamard sequence. Spread data symbol are interleaved to ensure frequency diversity across sub-carrier. The PSK modulated data symbol can be denoted, as illustrated in EQ. 1, by $Sy_i$ i-th symbol, $C_q$ is chip sequence of length q, each data symbol spreads by Q chip sequence.

$$Sy_0C_0, Sy_0C_1, \ldots, Sy_0C_{Q-1}; Sy_1C_0, Sy_1C_1, \ldots, Sy_1C_{Q-1}; \ldots; Sy_iC_0, \ldots, Sy_iC_{Q-1} \quad \text{EQ. 1}$$

The method of operation in DSSS-OFDM modulator 104 with C carrier over considered Bandwidth Bw, sub-carrier having separation of $$\Delta f = Bw/C \quad \text{EQ. 2}$$

$\Delta f$ is chosen in such a way there exist no inter carrier interference (ICI) by considering an OFDM block duration $\Delta T=1/\Delta f$, and each block has cyclic prefix (CP) as a guard interval to prevent inter-block interference caused by multipath propagation.

OFDM modulated signal obtained after an inverse Fast Fourier Transform (IFFT) from the method of operation represented in DSSS-OFDM modulator 104 is expressed according to EQ. 3.

$$y(c) = S_{yC}C_q * H_C + N_C \quad \text{EQ. 3}$$

where $S_{yC}$ is PSK modulated symbol transmitted on C-th carrier, $C_q$ represents the chip code q={0, 1 ... Q−1}, Q indicates length of chip code. $H_C$ represents C-th channel transfer function corresponding to sub-carrier frequency $F_i = F_0 + C*\Delta f$, $N_C$ is noise which can be due to multipath interference or Atmospheric noise. The length of Q is chosen as Q>(Bw*$T_{mt}$) where $T_{mt}$ is estimated channel multipath spread duration.

Figure 3:
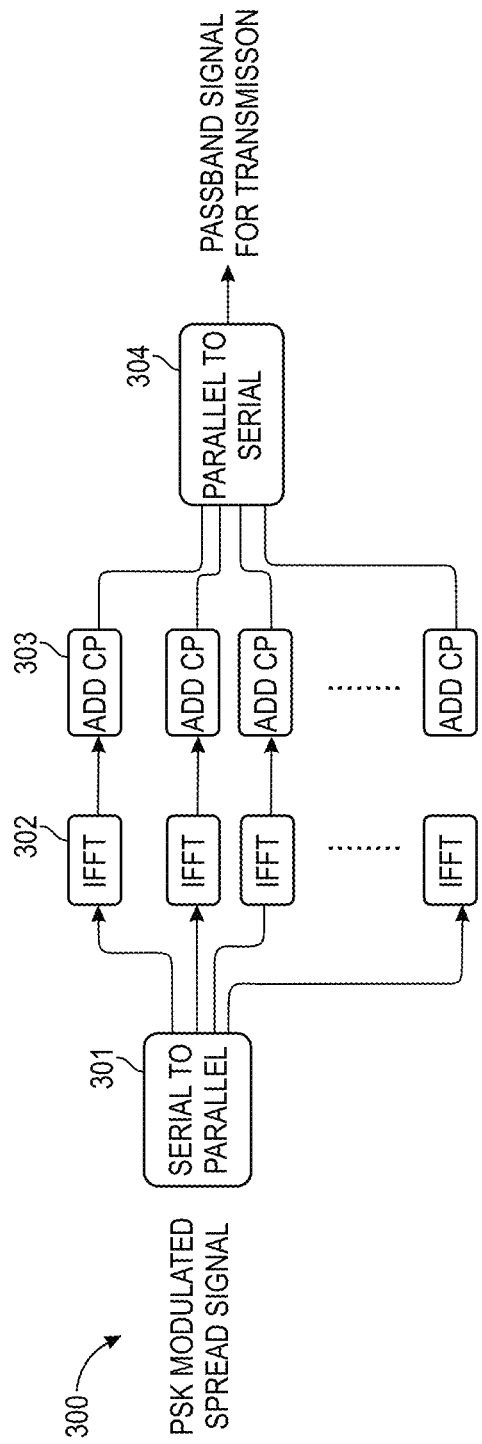
FIG. 3 illustrates a DSSS-OFDM modulator according to an example herein.
Figure 4A:
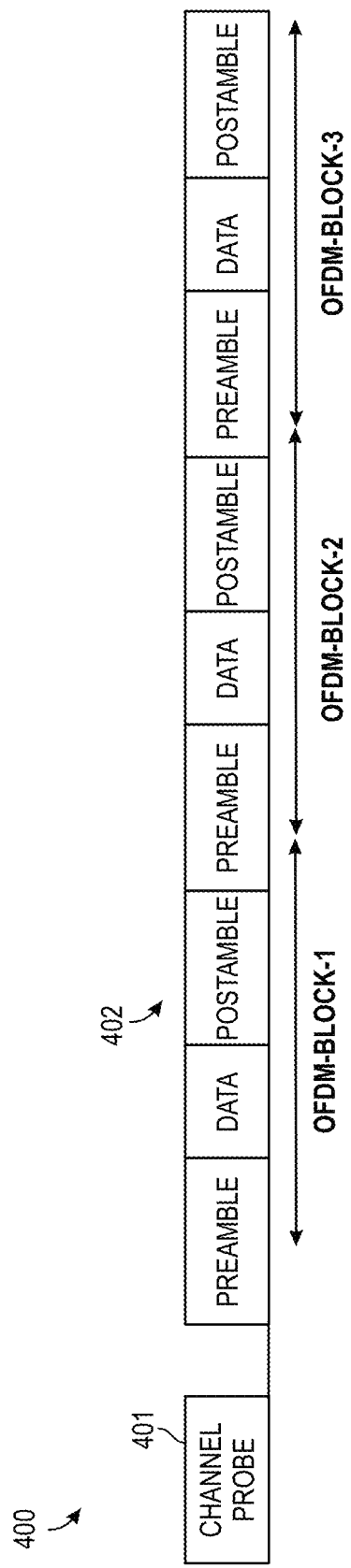
FIG. 4A illustrates a data signaling frame with channel probe, preamble and data embedded on three DSSS-OFDM blocks according to an example herein.

In the method after OFDM Modulation 104, PSK modulated baseband symbols are assigned to orthogonal sub-carriers there by shifting signal to passband before transmission, there present 1=C/Q data symbols per OFDM block where C is the number of the carrier and Q is the length of the chip sequence FIG. 3. At the receiver end a noisy signal is received. Complete signaling structure 400 of three DSSS-OFDM blocks 402 (OFDM-Blocks 1, 2, 3) with channel probe 401 is shown in FIG. 4A. The number of OFDM blocks is decided based on the data symbols needed to be transmitted at required bit rate. Each OFDM block has preamble, data and postamble data fields.

Synchronizer 109 generates a synchronized modulated data signal. The synchronizing of the modulated data signal includes performing a timing synchronization to detect configuration selection symbols included in the data payload. In an embodiment, the synchronization comprises a coarse synchronization and a fine timing synchronization. The synchronization uses distinct synchronizing sequence that gives high and more prominent correlation peak over various channels even in the presence of multipath due to highly reflective atmosphere. In an embodiment, the synchronized data signal is filtered for maximizing the SNR using a matched filter.

The signal generated is transmitted over communication channel 107 through a speaker 106, here communication channel is atmospheric free space, where the transmitted signal is corrupted as the channel suffers from extensive multi-path propagation depending on the orientation of the receiver, transmitter and relative position of reflectors such as walls and ceilings. Unpredictable motion of transmitter and receiver which causes motion induced Doppler frequency shift, these challenges are addressed by synchronization and Doppler estimation and offset frequency correction techniques.

The method 108 comprises receiver design too. A received signal picked up by a microphone 108 is synchronized by a synchronizer 109. The synchronization of the received signal is done in 2 stages, initial frame synchronization followed by frequency synchronization.

Figure 5A:
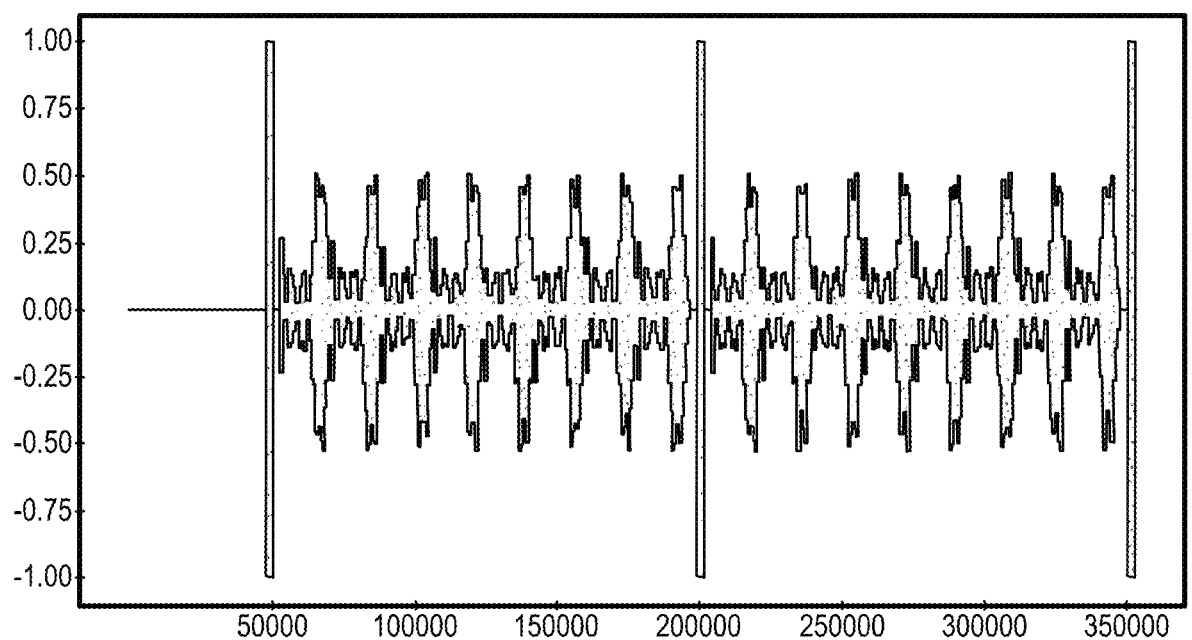
FIGS. 5A and 5B illustrate a received signal frame synchronization (FIG. 5A) of preamble and postamble with respective correlation peak (FIG. 5B) according to an example herein.
Figure 5B:
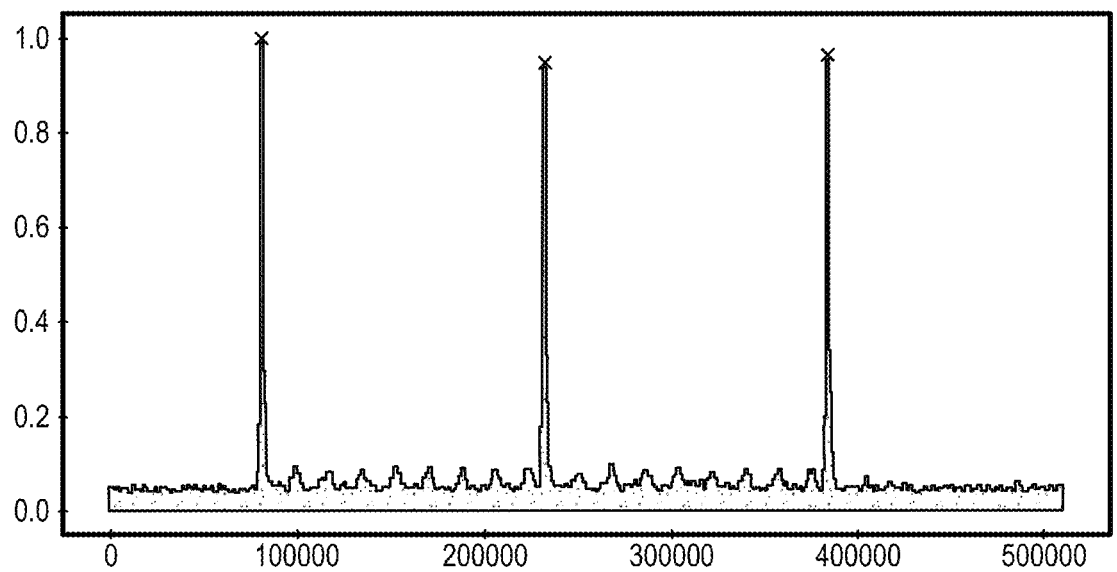

The method of timing synchronization in synchronizer 109 is necessary to obtain correct data start, which can be done by including channel probe in data signaling frame is shown in FIG. 4A at transmitter end, where barker sequence or PN sequence can be used in a channel probe data field 401, which can be detected by correlation with channel probe at receiver end as shown in expression EQ. 4, such correlation done at receiver end to detect data start from received signal can be observed from an example in FIG. 5B representing 3 predominant peaks for 3 OFDM blocks as preamble to detect data start.

Peak detection based synchronization using cross correlation of received signal with known preamble is given as EQ. 4.

$$r_{yx}(m) = \Sigma_{N=0}^{N-1} r_y(k) r_x(k-m) = r_y(m) * r_x(m) \quad \text{EQ. 4}$$

where $m = (0, 1, \ldots, N-1)$, k is the loop variable for summation from 0 to N−1, $r_y$ is the received baseband signal, $r_x$ is the sent baseband signal $r_{yx}$ is the cross-correlation of $r_y$ and $r_x$.

The method 100 comprises compensating the demodulated data signal by estimating a time-varying channel response from known pilot symbols. The compensating the demodulated data signal further comprises estimating individual Doppler shifts caused by a Doppler frequency drift due to relative movement of a receiver with respect to the transmitter and removing the estimated individual Doppler shifts from the demodulated signal. Doppler frequency shift occurs due to relative movement between transmitter and receiver, this relative movement shifts the frequency of received signal $f_{rx}$ by $f_d$ from the frequency of transmitted signal $f_{tx}$ according to EQ. 5. This frequency drift must be predicted and corrected accordingly.

$$f_{rx} = f_{tx} + f_d \quad \text{EQ. 5}$$

The method in 108 includes initial estimation of Doppler frequency on short synchronization preamble-postamble sequence according to EQ. 6 to obtain estimate of initial Doppler radical frequency shift $\hat{\alpha}$ initial compensation done to correct coarse frequency shift $$amp(\omega)e^{j\varphi(\omega)} = FFT(Tx_p(t)Rx_p^*(t)) \hat{\alpha} = \text{argMaxAmp}(\omega) \quad \text{EQ. 6}$$

where $Tx_p$ is the sent preamble, $Rx_p$ is the received preamble,

The later stage of frequency offset correction is based on resampling samples between preamble and postamble sequence obtain radical frequency shift $\hat{\alpha}$ post FFT signal. The data symbol estimate depends on $\hat{\alpha}$ and its mean square error according to EQ. 8.

$$r_y = \int_0^T u_m e^{-j\hat{\alpha}t} e^{-j2\pi k \Delta ft} \quad \text{EQ. 7}$$

$$E_d = \sum_1^J |\hat{d}_c(\hat{\alpha}) - d_c(\hat{\alpha})|^2 \quad \text{EQ. 8}$$

$$(\hat{\alpha}) = \text{argMin} E_d(\hat{\alpha}) \quad \text{EQ. 9}$$

where T is the duration of a block, J is the number of symbols per block, $u_m$ is the received baseband samples array, $E_d$ is the mean square error of that particular symbol, $d_c$ is the decoded symbol, $\hat{d}_c$ is the estimation of the decoded symbol, and k is the number of bins of approximated coarse Doppler correction.

Figure 6:
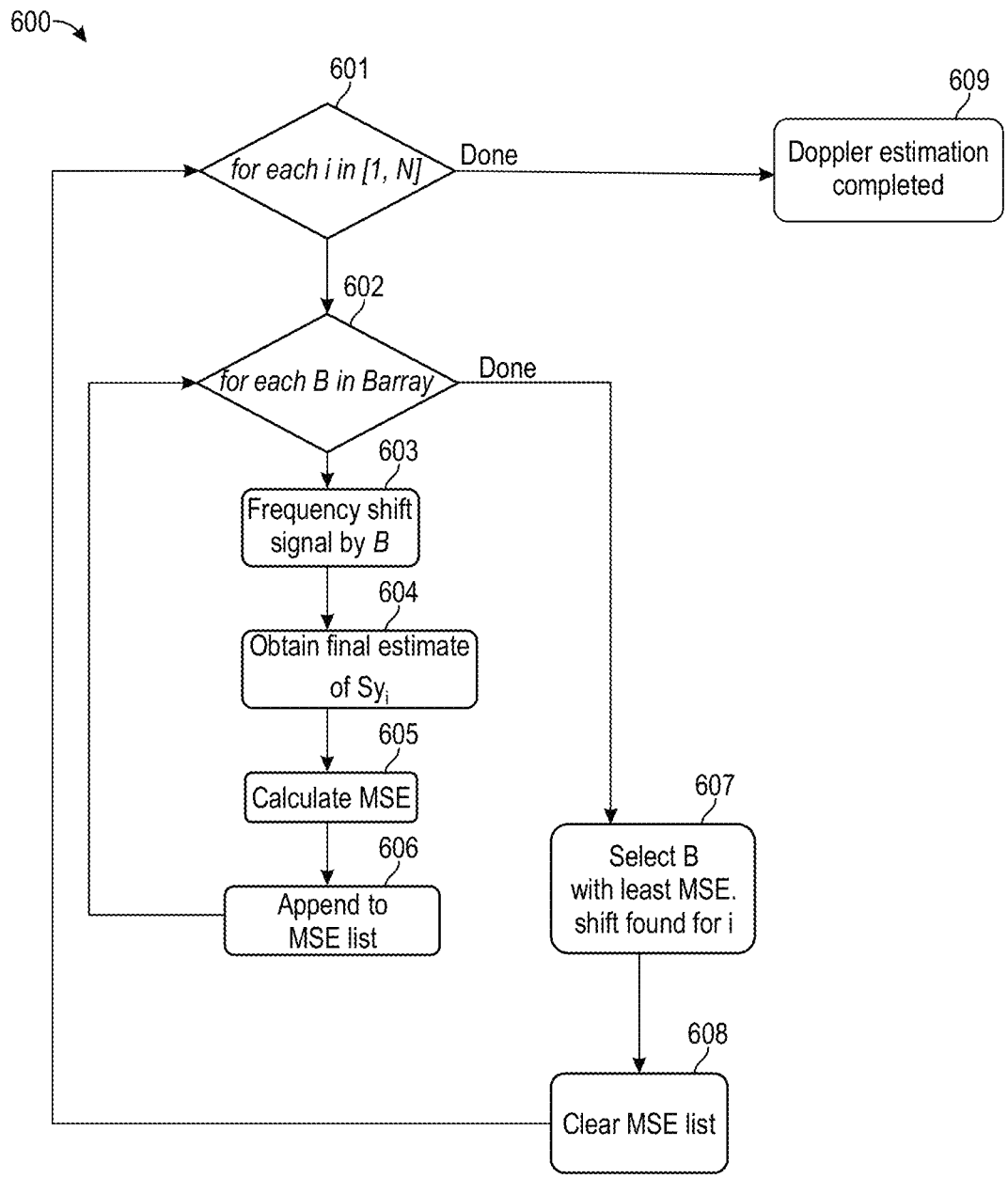
FIG. 6 illustrates a flow diagram for a Doppler estimation algorithm using a minimum mean square error of a hypothesized value according to an example herein.

The square error value is calculated for number of hypothesized $\hat{\alpha}$ values according to EQ. 9, best hypothesis $\hat{\alpha}$ is chosen to compensate fine frequency shifts according to EQ. 7, as explained with respect to FIG. 6.

Figure 7A:
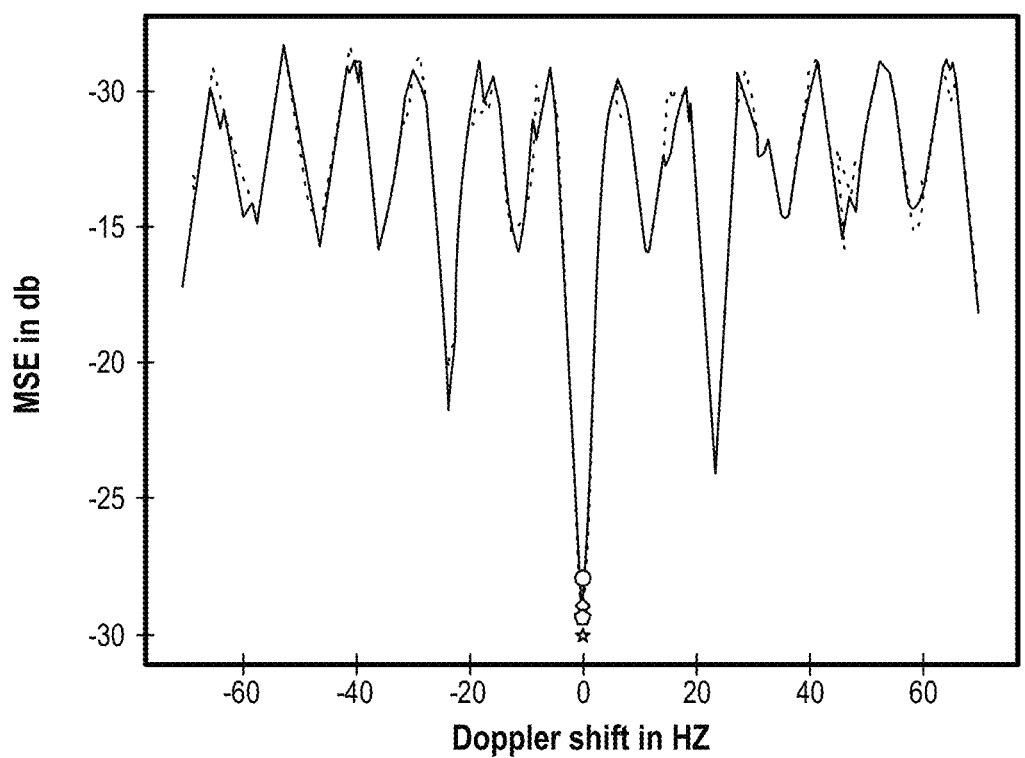
FIGS. 7A and 7B illustrates a Doppler frequency shift estimation without movement (FIG. 7A) and with movement (FIG. 7B) between transmitter and receiver according to an example herein.
Figure 7B:
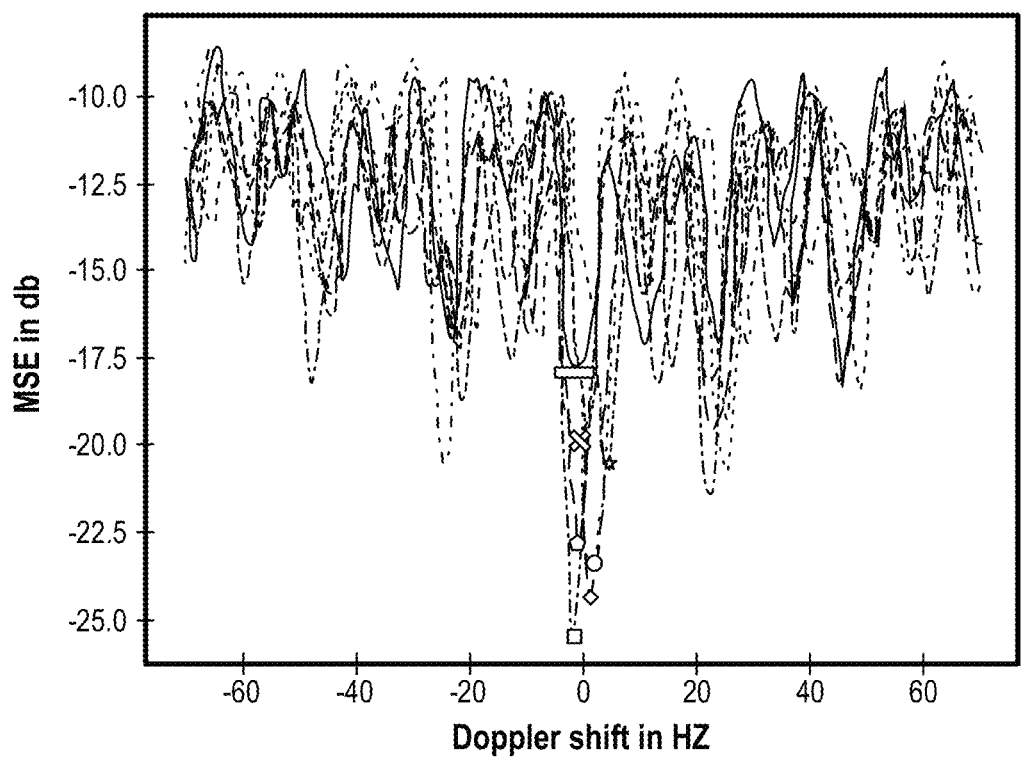

FIG. 6 illustrates a process flow for Doppler frequency shift estimation with an example for two set of OFDM signal recorded with and without relative movement between transmitter and receiver. FIG. 7A shows Doppler estimation (MSE) in hertz (Hz) for each OFDM block with no offset frequency with squared error ranging −28 dB to −30 dB (decibels). FIG. 7B shows Doppler estimation for each OFDM blocks with frequency offset 1 Hz to 10 Hz due to movement of receiver with respect to transmitter with squared error ranging −18 dB to −25 dB. The Doppler correction is verified up to 100 Hz considering available bandwidth selection for specific application cases.

The method 108 comprises signal detection for DSSS-OFDM demodulation from synchronizing signal begins with multiplying with corresponding carrier frequency to retrieve signal in baseband and performing despreading, de-interleaving as illustrated in method step 111. Despreading is performed by counter multiplying synchronized received signal with the same chip code used during spreading at transmitter end followed by FFT modulation removing cyclic prefix in each block from FIG. 8, new set of signal represented according to EQ. 10.

$$rs_q = C^*_q y_{ql+i} = Sy_q H_q + N_q C^*_q \quad \text{EQ. 10}$$

Rearranging $rs_q$ into I blocks each of length Q vector yields EQ. 11.

$$rs_i = Sy_i H_i + N_i \quad \text{EQ. 11}$$

where $Sy_i$ i-th PSK modulated symbol, $H_i$ frequency domain channel coefficient, $N_i$ noise corresponding sub-carrier post FFT demodulation H corresponding to frequency domain channel coefficient related to delay domain coefficient h, and Ca represents the chip code of length q.

$$H_i = G_i h \quad \text{EQ. 12}$$

where $G_i$ is matrix of size Q×M.

EQ. 12 can be rewritten as EQ. 13.

$$rs_i = Sy_i G_i h + N_i \quad \text{EQ. 13}$$

Multiply EQ. 13 by conjugate transpose $G'_i$ to get EQ. 14.

$$S_i = \left(\frac{1}{Q}\right) G'_i rs_i = Sy_i h + Nv_i \quad \text{EQ. 14}$$

where the signal $S_i$ serves starting point for data symbol detection $Sy_i$.

Figure 9:
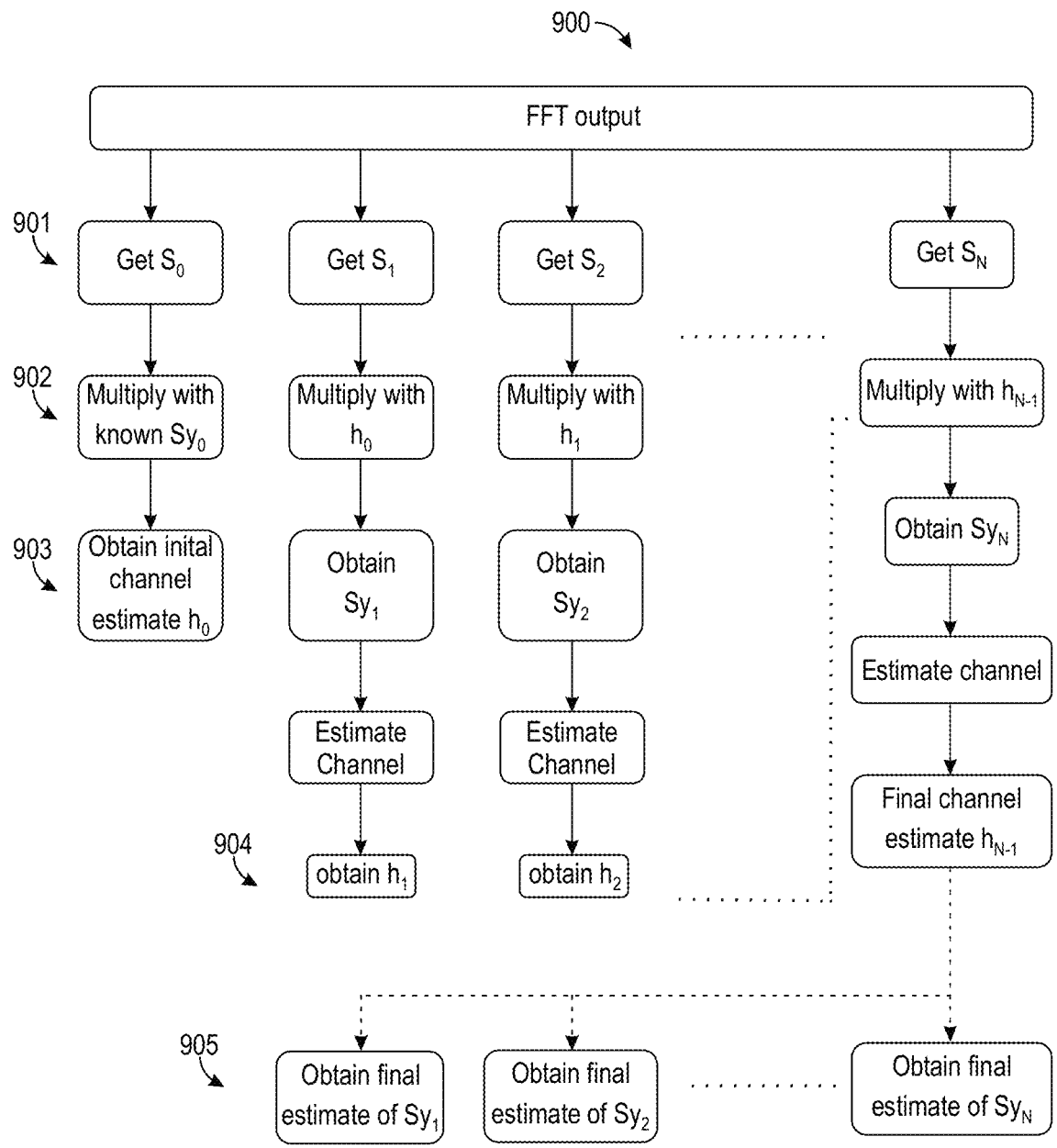
FIG. 9 illustrates a method for channel estimation process by coherent detection according to an example herein.

The method with channel equalization estimator 112 illustrates estimation of unknown channel $\hat{h}$ using either coherent detection or differential coherent detection, in coherent detection 900 in FIG. 9 preamble symbols $Sy'_0$ in each OFDM blocks uses as pilot for estimation of unknown channel.

$$\hat{h} = \hat{h}_0 = Sy'_0 S_i \quad \text{EQ. 15}$$

Knowing $\hat{h}$, the remaining symbols are detected $\hat{S}_i$ according to EQ. 16, followed by decision making EQ. 17, $\hat{h}$ used to estimate next symbol decision until last symbol decision is done according to EQ. 19.

$$Sy_i = \frac{h'\, S_i}{\|\hat{h}\|^2} \quad \text{EQ. 16}$$

$$Sy'_i = dec\left(Sy_i\right) \quad \text{EQ. 17}$$

$$\hat{h}_1 = Sy'^*_1 S_1 \quad \text{EQ. 18}$$

$$\hat{h} = \frac{1}{2}(\hat{h}_0 + \hat{h}_1) \quad \text{EQ. 19}$$

The method in 108 comprises multi-channel processing coherent detection where in maximum ratio combining for spatial diversity reception evaluated by considering N received output whose FFT output $S_i^n$ is fed for N processors according to EQ. 20.

$$S_i^n = Sy_i h^n + Nv_i \quad \text{EQ. 20}$$

The maximum ratio combination produces a decision variable according to EQ. 21.

$$Sy_i = \frac{1}{\sum_{n=1}^{N}\|\hat{h}^m\|^2} \hat{h}^{m'} S_i \quad \text{EQ. 21}$$

FIG. 10 and FIG. 11 illustrate an example of DSSS-OFDM decoding signal recorded at 30 feet and 80 feet, data symbols modulated with M-Ary PSK and transmitted over noisy channel. The constellation graph shows M-Ary PSK modulated symbols for transmitted over orthogonal sub-carrier, and corruption of transmitted symbol by noisy channel for various SNR, complete recovery of symbols after FEC error correction. Higher bit-rate achieved based on bandwidth availability for transmission and exceptional performance achieved in multi-path propagation and lower SNR case.

Figure 12A:
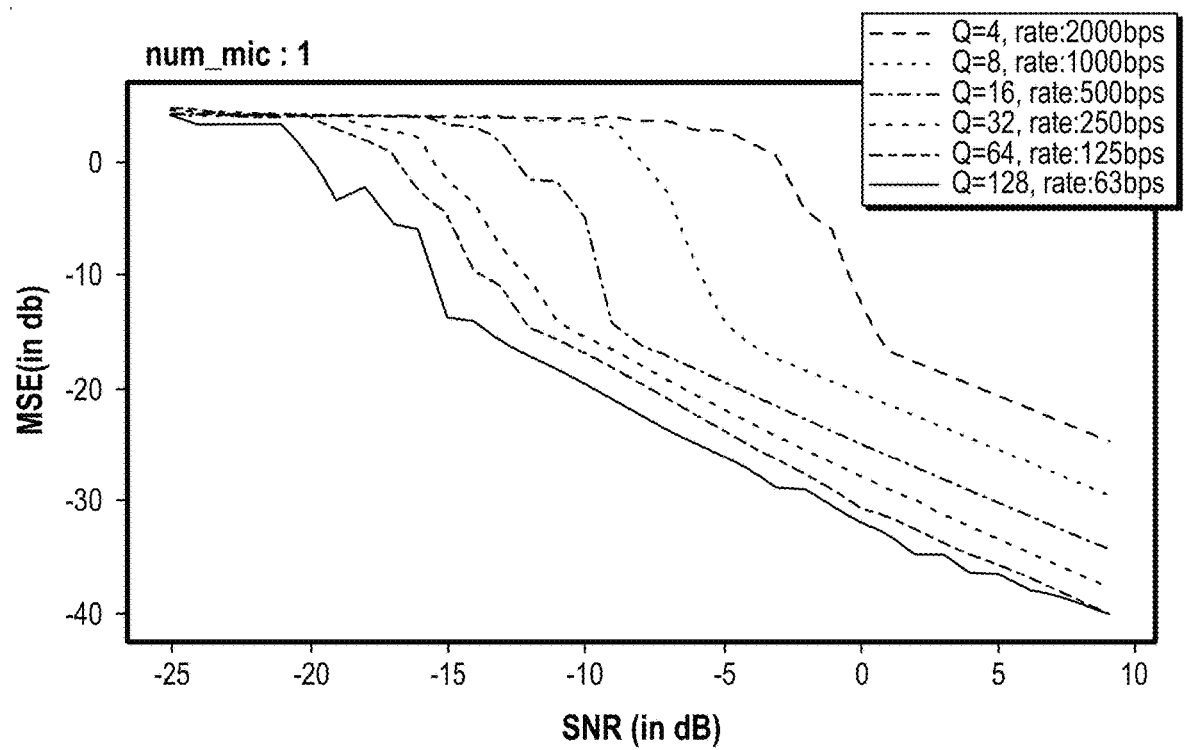
FIGS. 12A, 12B, 12C, and 12D illustrate mean squared error (MSE) vs SNR with coherent detection from different microphones according to an example herein.
Figure 12B:
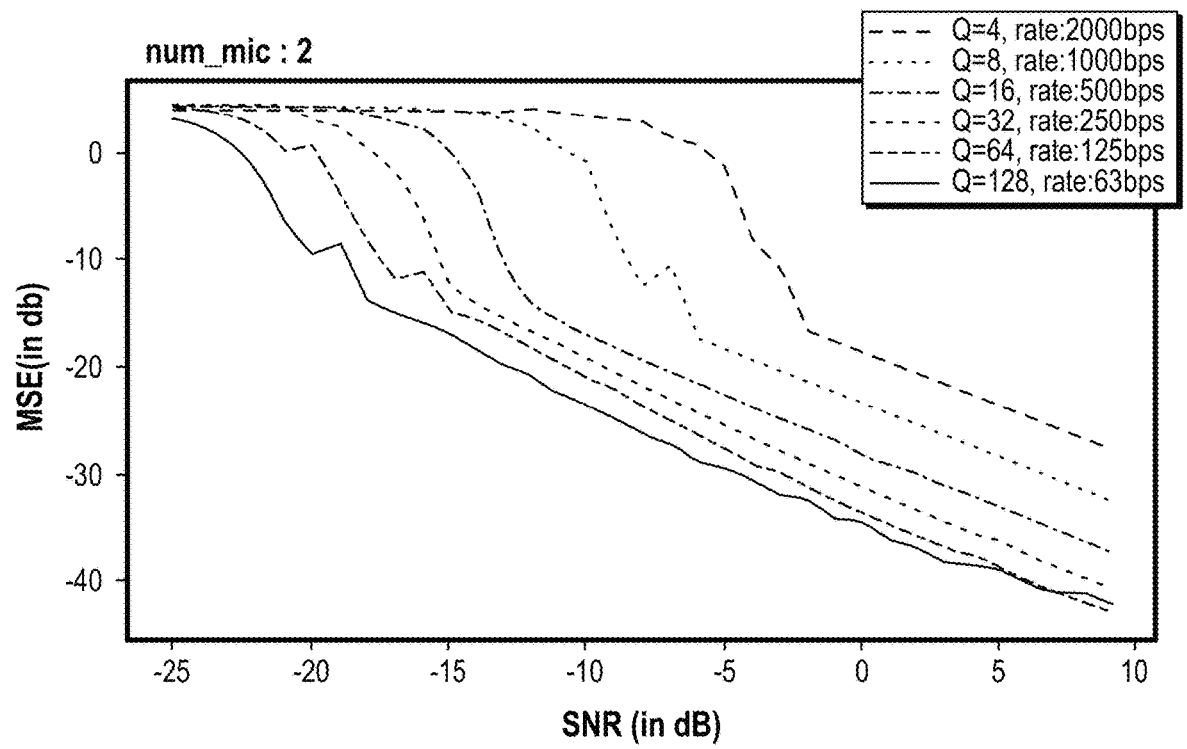
Figure 12C:
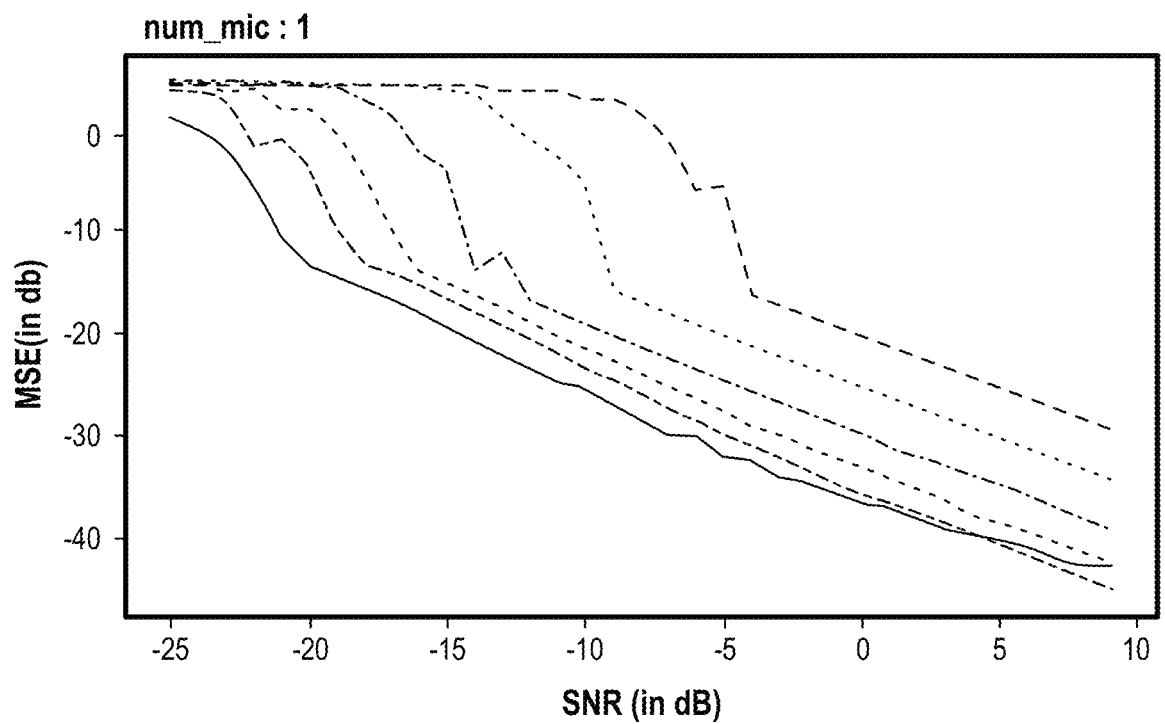
Figure 12D:
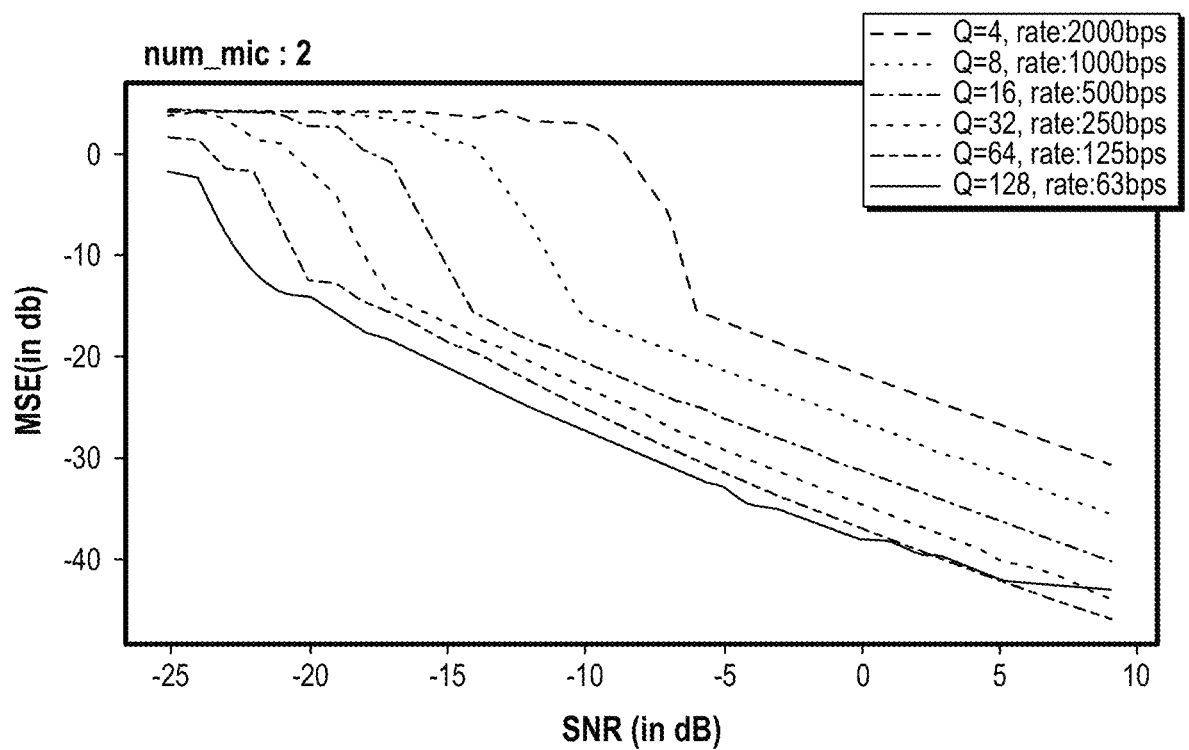
Figure 13A:
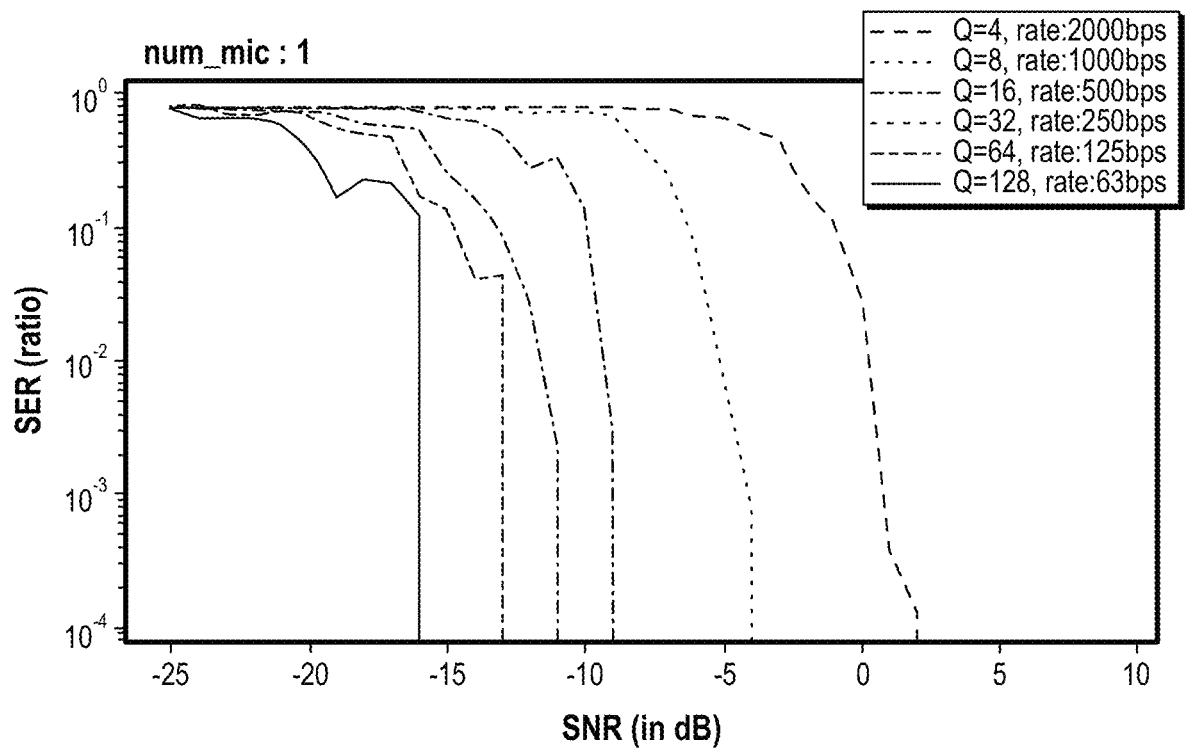
FIGS. 13A, 13B, 13C, and 13D illustrate symbol error rate (SER) vs SNR with coherent detection from four different microphones according to an example herein.
Figure 13B:
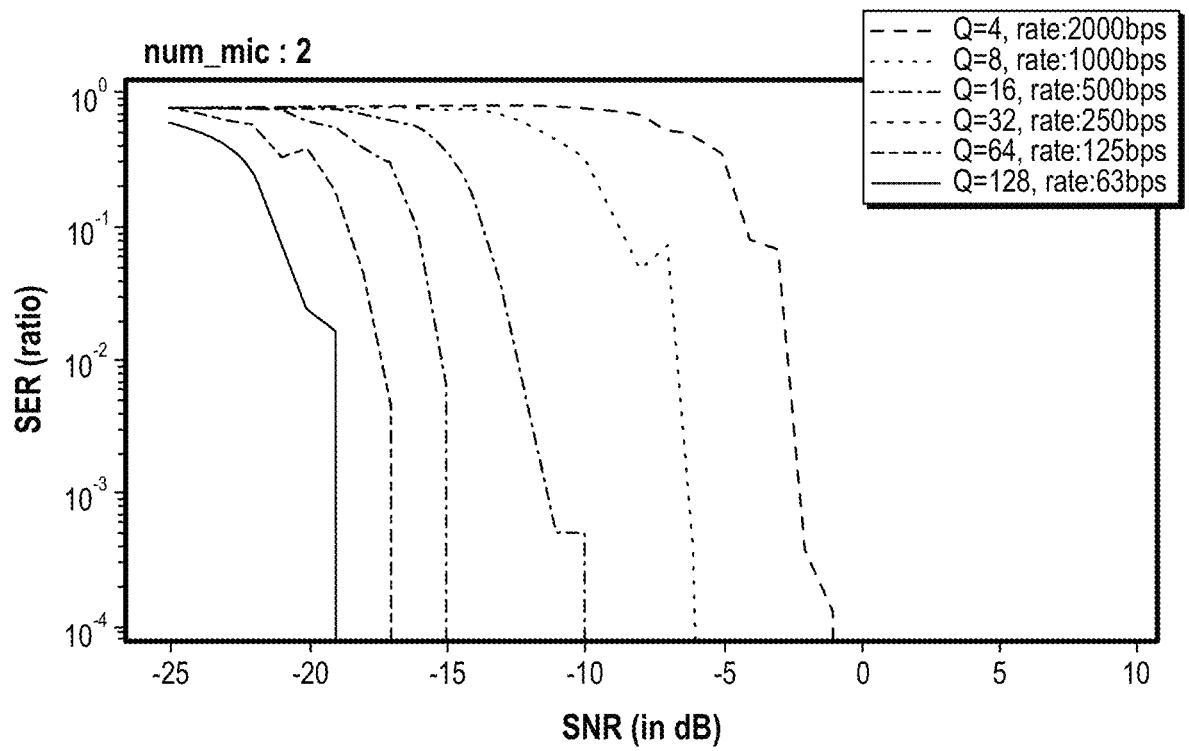
Figure 13C:
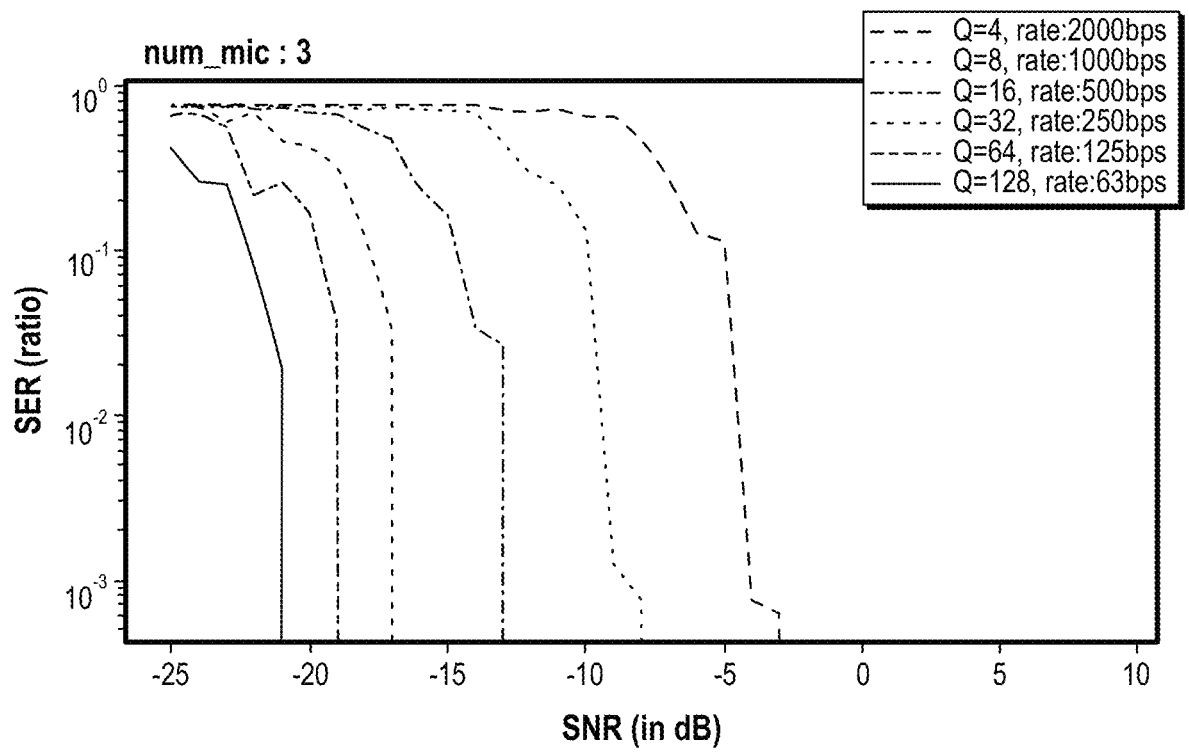
Figure 13D:
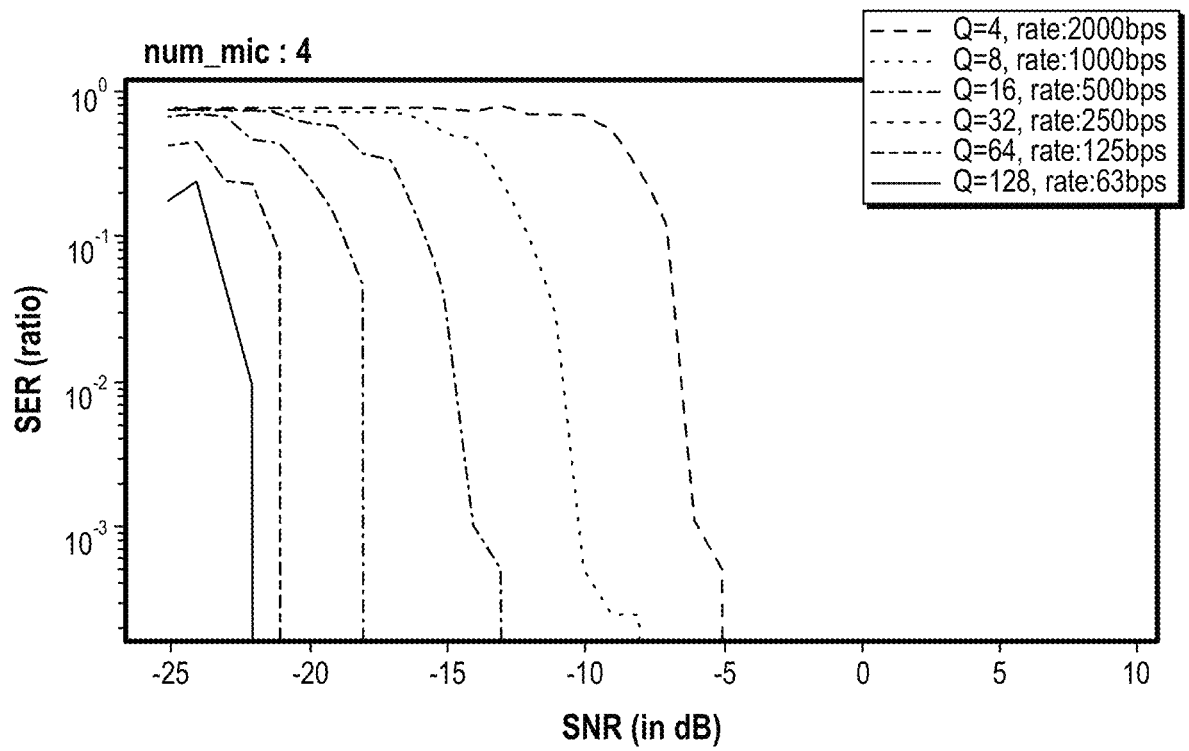

The results in FIG. 12 shows the mean squared error response (MSE) of different SNR considering variable Q and variable bit rate for a first microphone 1 (FIGS. 12A and 12C) and second microphone 2 (FIGS. 12B and 12D). The graphs shown in FIG. 13 indicates the symbol error response for different Q and bit rate at lower SNR. Each graph (FIGS. 13A, 13B, 13C and 13D) denote variation of MSE and SER with respect to SNR, considering various Q factor represented in different color code shown in graphs FIG. 12 and FIG. 13. The lower the MSE and SER the higher data decode rate. A higher Q factor provides reliable communication over longer distance at the cost of data rate. Overall, for given SNR, an increase in number of microphones provides lower MSE and SER in turn higher efficiency in terms of a data decode rate.

Experimental results verified by inventor for variable distances up to 100 feet, assuming guard interval Tg=(Q/Bw) results in bandwidth efficiency B depending on Carrier C and Q length of chip code according to EQ. 22.

$$Bw = \frac{1}{Q}\frac{1}{1+Q/C} \quad \text{EQ. 22}$$

The motivation behind a DSSS-OFDM is to achieve bandwidth efficiency in coherent communication, by effective utilization of narrow bandwidth in near ultrasonic acoustic (audio) range at 17 kilohertz to 22 kilohertz (kHz), which minimizes the impact of channel variations and interference. This technology opens the door for a new medium of near field data communication, which does not involve any investment in hardware and makes use of all smart devices that have a speaker and microphone with sampling rate of either 44.1 KHz or 48 KHz. Since human ears have very limited sensitivity (response) beyond 14 kilohertz sound, this presents a free bandwidth that can be exploited for data communication. According to study normal adults can hear only at 12-14 kilohertz highest frequency over human audible range of 20 Hz to 20 kilohertz.

The method 100 provides an efficient way of transmitting data over ultrasonic range. The transmitted data is affected by the noise and disturbances over the channel, to reduce the effect of the disturbance on the transmitted data, the method 100 performs channel compensation using coherent estimation of time varying channel using pilot symbols in each OFDM blocks. The method provides an efficient, simple and low cost way of transmitting data dynamically thereby lowering consumption of resources, increasing the performance of the transceiver and quality of the transmitted data at lower SNR conditions enabling multi-user communication network.

A DSSS-OFDM transceiver structure as described in FIG. 1 according to an example herein has a spread sequence to enable signal detection at low signal to noise ratio thereby enabling efficient multi-user communications, and a transceiver structure as in FIG. 1 with modified coherent receiver is used to achieve high data rate by transferring data symbols over sound in near ultrasonic acoustic (audio) range. The technique used to combat the effect of time varying channel and Doppler fluctuations thereby demonstrating excellent throughput even in the extremely band limited acoustic channel on a variety of devices including ANDROID R: operating system of Google Inc., the iOS operating system of Apple Inc., and the WINDOWS PHONE® operating system of Microsoft Corporation, and the BLACKBERRY'R operating system of BlackBerry Limited. The multiple pilot symbols in each OFDM data blocks enable time varying channel estimation and equalization to compensate channel distortion resulting in significant improvement in reduction of error hence increasing performance of the system even at lower SNR conditions.

Transceiver includes a transmitter and a receiver. In an embodiment, the transmitter and the receiver is an electronic device, for example, one or more of a personal computer, a tablet computing device, a mobile computer, a mobile phone, a smartphone, a portable computing device, a personal digital assistant, a laptop, a wearable computing device such as the GOOGLE GLASS R of Google Inc., the APPLE WATCH® of Apple Inc., etc., a touch centric device, a client device, a portable electronic device, a network enabled computing device, an interactive network enabled communication device, a gaming device, an image capture device, any other suitable computing equipment, combinations of multiple pieces of computing equipment, etc. In an embodiment, the user device is a hybrid computing device that combines the functionality of multiple devices. Examples of a hybrid computing device comprise a cellular telephone that includes a media player functionality, a gaming device that includes a wireless communications capability, a cellular telephone that includes game and multimedia functions, and a portable device that receives electronic mail (email), supports mobile telephone calls, has a media player functionality, and supports web browsing. In an embodiment, computing equipment is used to implement applications such as media play back applications, for example, ITUNES® from Apple Inc., a web browser, an electronic mail (email) application, a calendar application, etc.

In an embodiment, a DSSS-OFDM transceiver has a channel encoder 101, a pulse shaping filter, an M-Ary PSK modulator 102, a synchronizer 109, an M-Ary PSK demodulator 113, a channel equalization estimator 112, and a channel decoder 114 as shown in FIG. 1. The DSSS-OFDM transceiver in wireless communication system to minimize the impact of channel variations and interference. The DSSS-OFDM is a linear modulation scheme that encodes data symbol on orthogonal sub-carrier which eliminate ISI as data symbol on respective subcarrier has no impact on other symbols that are forward error correction (FEC) encoded in order to control error occurred during transmission over noisy channel. The modulated data signal is synchronized to get correct data start followed by the demodulation and equalization of the channel.

The channel encoder 101 adds redundancy to the transmitted data signal so that errors caused by noisy channel during transmission is corrected at the receiver: this process of encoding channel errors correction is called error correction coding (ECC). In an embodiment, the error control coding (ECC) is achieved with any one of the following techniques based and application.
1. Convolutional Codes: Here, parity symbols are generated by sliding window of arbitrary length on bit streams. At decoder end, either Viterbi algorithm or sequential decoding used to return hard decision.
2. Block Codes information is block of finite length bit sequence where n-k redundant bits are appended to k information bits. Reed-Solomon Code-application in CD, DVD, hard disk drive, Hamming codes.
3. Turbo Codes make use of two or more Combinations of convolutional codes along with interleaver producing block code.

The pulse shape filter integrated along with M-Ary PSK modulator 102 changes the waveform of the transmitted encoded data signal. EQ. 23 represent a pulse shaped transmitted signal.

$$Sy_C = \Sigma_0^{N-1} x_n * p(t-nT) \qquad \text{EQ. 23}$$

where $\{x_n\}$ is M-Ary mapped PSK modulated data symbols, p(t) is the impulse response of the pulse shaping filter, T is the signaling interval, n is the loop variable, and N is the number of symbols post-PSK modulator. The Pulse shaping filter is used to limit the bandwidth of transmitting symbol.

The DSSS-OFDM modulation of the pulse shaped signal according to EQ. 23 at various distinct orthogonal of sub-carrier frequency mapped to M-Ary PSK modulated symbols M=4, 8, 16. During the modulation, PSK modulated data symbols are spread on Q chip, each symbol spreading can be done using same chip code or different chip code based on security level desired. The interleaver maps codeword in particular known order and when burst error occurs at the receiver de-interleaver spread the error bits thus randomize error bits which can be corrected efficiently by ECC. The mapping of spread-interleaved codeword for data symbols, satisfying orthogonal condition across each sub-carriers results in data transmission rate >5K bps in variable channel conditions. Thereby making effective utilization of extremely narrow bandwidth ~5 kilohertz.

In the M-Ary PSK modulator 102 a symbol either M=4, 8, 16 arE considered desired data rate for the application, data symbols in each OFDM block are spread and interleaved according to EQ. 1. A orthogonal sub-carrier frequency $F_i = F_0 + C * \Delta f$ generated based on step size $\Delta f$ according to EQ. 2 used carry the data symbols in passband for each OFDM block for multi-user communication according to EQ. 3. $\Delta f$ is chosen such a way there exist no Inter carrier interference (ICI) by considering OFDM block duration $\Delta T = 1/\Delta f$, Guard interval as cyclic prefix is considered sufficient long such that multipath does not cause inter-block interference.

In an embodiment, the transmitter can transmit the modulated data signal by broadcast or by one to one communication to the receiver. In an embodiment, the data signal is transmitted over a communication channel 107. As used herein, "communication channel" refers to an atmospheric free space, such as, a space in air where the transmitted data signal is corrupted as the communication channel suffers from extensive multipath depending on the orientation of the receiver, the transmitter and relative position of reflectors such as a wall, a ceiling etc., resulting in severe Inter Symbol Interference (ISI). Unpredictable motion of the transmitter, the receiver, and frequency selective fading make coherent detection a challenging problem that are addressed in this disclosed transceiver design.

In an embodiment, communication channel 107 can be used by a network. The network is, for example, one of the internet, an intranet, a wired network, a wireless network, a communication network that implements BLUETOOTH® of Bluetooth Sig, Inc., a network that implements WI-FIR of Wi-Fi Alliance Corporation, an ultra-wideband communication network (UWB), a wireless universal serial bus (USB) communication network, a communication network that implements ZIGBEE® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, a public telephone network, etc., a local area network, a wide area network, an internet connection network, an infrared communication network, etc., or a network formed from any combination of these networks.

The general representation of received PSK modulated data signal R transmitted over single sub-carrier after corrupted by channel noise given according to EQ. 24.

$$R_{xi}(t) = T_{xi}(t) + \eta_{ei}(t)$$

where $T_{xi}(t)$ is transmitted DSSS-OFDM signal on one of the sub carrier, n, is additive noise in one of the subcarrier.

In an embodiment, the synchronizer 109 frame synchronizes the received modulated data signal, which involves correlation of synchronization bits encoded during transmission with received modulated data signal resulting in higher and more distinct peak where synchronization bits match. In an embodiment, the received modulated data signal is filtered in a matched filtered. In an embodiment, the frame synchronization is performed prior to any processing.

Doppler shift occurs when there is a relative movement between the transmitter and the receiver. The relative movement shifts the frequency of the transmitted data signal, making it different at the receiver end. Assuming that the additive noise is white Gaussian, the initial estimate of Doppler frequency $f_d$ is determined according to EQ. 5. Doppler estimation and compensation is done from transmitted data signal and received data signal is determined according to EQ. 9.

Consider an example of transmitting real-time dynamic data over sound waves connecting numerous smart devices without the need of additional hardware by making use of an available microphone and speaker. The transmitter can create and encode messages on selected audio, visual or audio-visual content using channel encoder 101 for correcting the errors caused by the channel in the receiver. The transmitter can select application or purposes of data transmission ranging from retail, user authentication, live event engagement real-time announcements, queue management and internet of things (IoT). Based on the application chosen, relevant encoding technique is utilized and the encoded data signal is filtered to make the encoded data signal efficient for transmission. Once the data signal is filtered, the filtered signal is frequency modulated and the digital signal is converted to an analog signal for transmission. The modulated data signal is transmitted by broadcasting or one to one communication to the receiver. The transmitter has an option to share the modulated data signal with relevant stakeholders or play in selected receivers at specific timing. The receiver receives the modulated data signal, filters, and synchronizes the modulated data signal. The synchronized data signal needs to be demodulated and decoded to extract original message (data signal) sent from the transmitter.

The transmitter user such as retail store owners, advertisers, brands or any client who intends to use the technology creates messages (data signals) that need to be encoded on audio, visual, audio-visual media contents. The source file on which data to be encoded can be selected and uploaded by the transmitter. The transmitter can select specific location, time or duration of day or date for which messages need to be transmitted, they can set different schedules, different messages dynamically depending on time and business requirement. Depending on the selection, different output files (the modulated data signals) will be generated and the transmitter can configure the receivers such as speakers, devices on user-interface to relay the messages based on the requirement automatically, securing the data without sharing individual receiver information to any third-party and accordingly maintain the privacy laws prevailed in country of business. The transmitter can observe statistics and data analytic on the number of people received the communication by demography and other user parameters, the rated conversion and the impacts as per the pre-decided criteria.

Consider another example, where the data is delivered to personal devices of users who are in physical proximity of venues where speakers are broadcasting the encoded messages on inaudible sound waves, comprising a user-interface at user's personal devices wherein it can store, render and demonstrate clickable links, information to users and trigger various activities. The data encoded on sound waves will be received, demodulated, decoded and stored and transformed into readable information at the user end, data encoded on sound waves will be received, demodulated, decoded and stored and transformed into readable information at the user end. The data received from individual user-interface will be stored for future references and certain programs, processing and activities will be executed based on that and the additional data will be pushed to render a complete set of information regarding real-time communication received by user.

Figure 2:
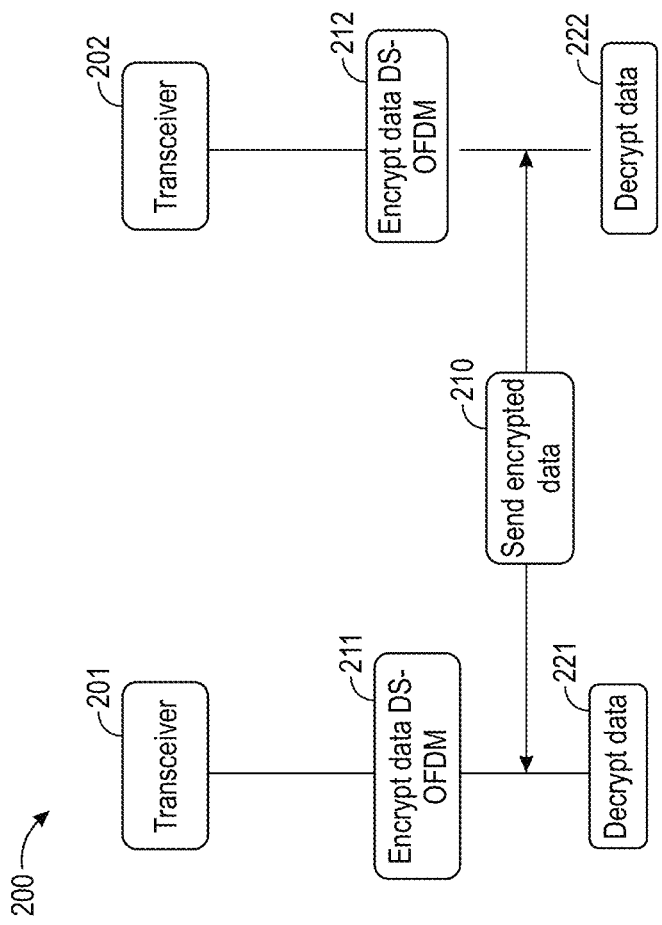
FIG. 2 illustrates a method for two way communication in multi-factor authentication using DS-OFDM according to an example herein.

FIG. 2 illustrates a method 200 for two way communication in multi-factor authentication using DS-OFDM according to an example herein. In FIG. 2, two transceiver devices 201 and 202 are operated by respective users. Devices 201, 202 can be any computing device having a transceiver operable in a near ultrasonic acoustic (audio) frequency range of a wireless communication network as described herein. In step 211, transceiver device 201 encrypts data using DS-OFDM. In step 212 transceiver device 202 encrypts data using DS-OFDM. In step 210, both devices 201, 202 can send encrypted data in real time to one another. In step 221, transceiver device 201 decrypts the received data. In step 222, transceiver device 202 decrypts the received data. In this way, real-time secure dynamic data can be sent over sound waves connecting transceiver devices. Also, the transceiver devices can be any smart device having a processor and available microphone and speaker. As a result, real-time secure dynamic data can be sent over sound waves connecting numerous smart devices without the need of additional hardware by making use of an available microphone and speaker.

FIG. 3 illustrates OFDM modulator 300 comprising of PSK modulated data symbols are spread (spread by serial to parallel converter 301) and data symbols are interleaved (by parallel to serial converter 304) for efficient error correction according to an example herein. The data signal 300 comprises data symbols. As used herein. "data symbol" refers to a group of bits that a single unit of data represents. The M-Ary PSK data symbol in each OFDM blocks includes data symbols along with a preamble and postamble symbols. OFDM modulated signal obtained after IFFT 302 includes cyclic prefix 303 as guard interval to nullify effect of ICI, that DSSS-OFDM signal has least impact of multipath fading.

FIG. 4A illustrates a DSSS-OFDM signaling frame 400 which include channel probe 401, preamble and postamble synchronization bits according to an example herein. Channel probe 401 used for frame synchronization to estimate beginning of OFDM signal. DSSS-OFDM receiver receives a signal with channel probe 401 and 3 OFDM blocks 402 as represented in signaling frame 400.

FIGS. 5A-5B illustrates synchronization of data start detection is achieved by cross correlation of received signal with known preamble according to an example herein. In an embodiment, initial preprocessing of received data signal (FIG. 5A) is achieved by synchronization, which is achieved in two levels. The first level is coarse timing synchronization followed by fine timing synchronization. The synchronization is necessary to detect the signal. Timing synchronization trigger is included in channel probe 401 as data signaling frame at a transmitter, a barker sequence or N bit PN sequence is used in channel probe, which can be detected by correlation with channel probe at a receiver. The next level of synchronization is the fine timing synchronization used to detect data start, which is necessary to detect symbol with minimal symbol error which is achieved from EQ. 4 to obtain correct data start for each OFDM block once each OFDM block extracted demodulation process continues for the blocks 402 of FIG. 4A. FIG. 5B shows 3 distinct peak results from cross correlation of preamble of received signal from which start of respective OFDM blocks are estimated.

FIG. 6 illustrates method for Doppler frequency shift estimation from received demodulated signal from MSE 600, calculating β 601 by which signal frequency to be shifted in loop 602 (including frequency shift by β (step 603), obtain final estimate $Sy_i$ (step 604), calculate MSE (step 605), and append to MSE list (step 606)) to obtain MSE for each block find β for a minimum MSE 606 this process is repeated for entire band 608 until least MSE shift found (step 607) and MSE list cleared), and control returns to Doppler estimation completed (step 609).

FIGS. 7A and 7B illustrate signals used in the method for Doppler frequency shift prediction 600 and correction from received demodulated signal as individual Doppler shifts caused by a Doppler frequency drift due to relative movement of a receiver with respect to the transmitter and removing the estimated individual Doppler shifts from the demodulated signal. More specifically. FIG. 7A shows an example of the Doppler estimation curve for the non-movement case, and FIG. 7B shows an example of the Doppler estimation for the movement case.

The solid and dotted line in both the figures represent different data blocks on which the doppler correction has been performed on. Doppler frequency shift occurs due to relative movement between transmitter and receiver, this relative movement shifts the frequency of received signal by $f_d$ according to EQ. 5.

Figure 8:
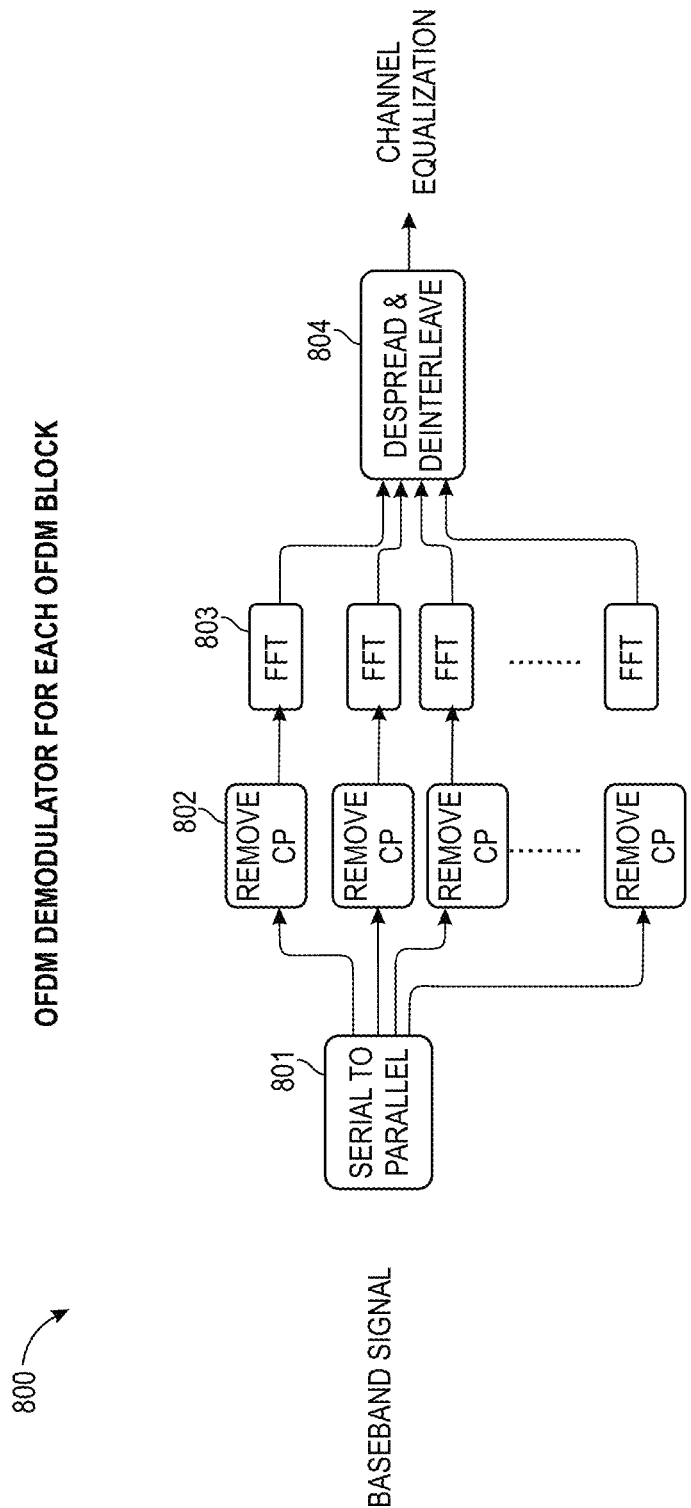
FIG. 8 illustrates a DSSS-OFDM demodulator processing for each OFDM block according to an example herein.

The received signal is multiplied by sub-carrier as in transmitter end to bring back signal to baseband for further processing by OFDM Demodulator is represented in FIG. 8. OFDM Demodulator 800 comprises serial to parallel converter 801 and signal detection for DSSS-OFDM demodulation from synchronizing signal begins with multiplying with corresponding sub carrier frequency to retrieve signal in baseband and performing despreading, de-interleaving as illustrated in method 804. Despreading is performed by counter multiplying synchronized received signal from same chip code used during spreading at transmitter end followed by FFT modulation 803 removing cyclic prefix 802 in each block, results new set of signal represented according to EQ. 10.

FIG. 9 illustrates channel estimation 900 where channel is considered to be time varying and unknown, the estimation of unknown channel $\hat{h}$ done using either coherent detection or differential detection, in coherent detection preamble symbols $Sy'_0$ in each OFDM blocks used as pilot 901 for estimation of unknown channel according to EQ. 15, knowing initial estimate 902 $\hat{h}$ remaining symbols are detected $S_i$ according to EQ. 16, followed by decision 903 making EQ. 17, $\hat{h}$ used to estimate next symbol decision 904 till last symbol decision is done according to EQ. 19. The maximum ratio combination produces decision variable 905 according to EQ. 21.

FIG. 9 illustrates a modulated data signal corrupted with channel noise according to an example herein. The modulated signal is transmitted to a receiver through a channel. The transmitted data signal is corrupted as the channel suffers from extensive multi-path depending on the orientation of the receiver and relative position of reflectors such as walls, ceiling etc., and resulting severe inter-symbol interference (ISI). The demodulation and channel compensation is performed on the received modulated data signal to combat the effect of ISI, as disclosed in the detailed description of FIG. 1.

Figure 10A:
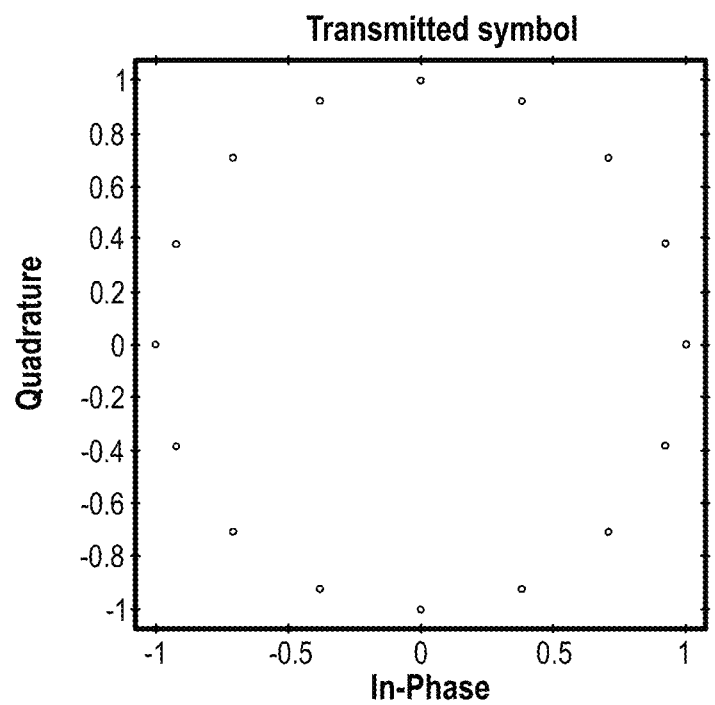
FIGS. 10A, 10B, and 10C illustrate constellation diagrams for transmitted symbols (FIG. 10A), where the signal is corrupted in the channel by noise (FIG. 10B) and decoded symbol (FIG. 10C) at rate 1200 bps for signal received from distance of 30 feet according to an example herein.
Figure 10B:
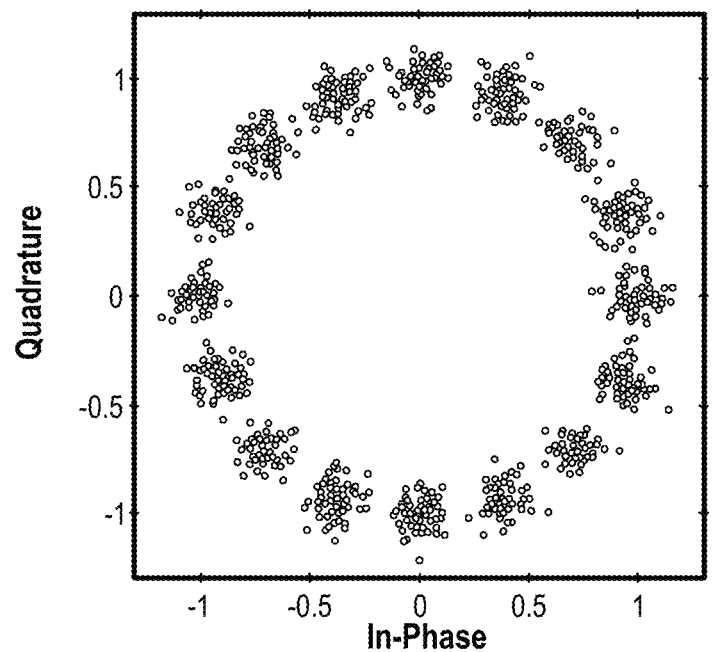
Figure 10C:
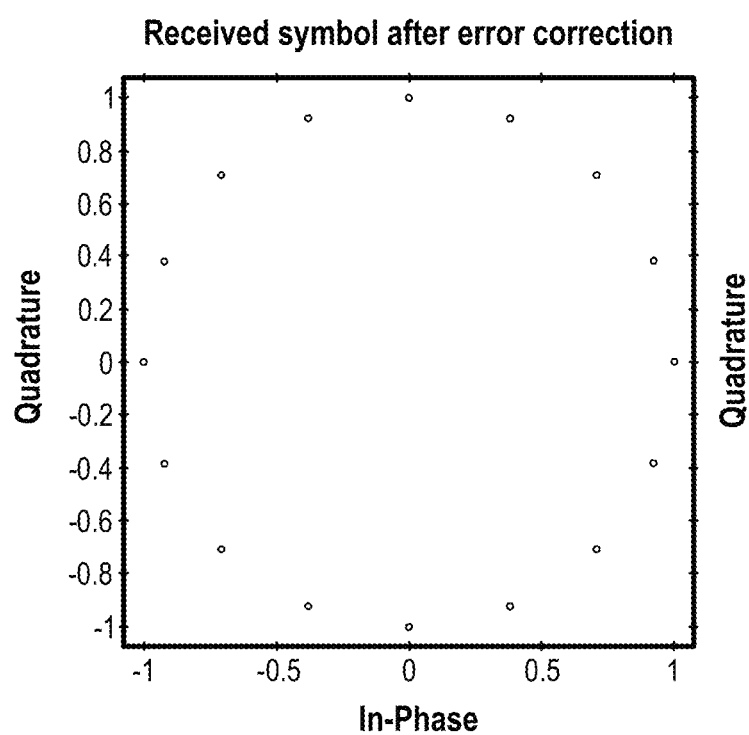
Figure 11A:
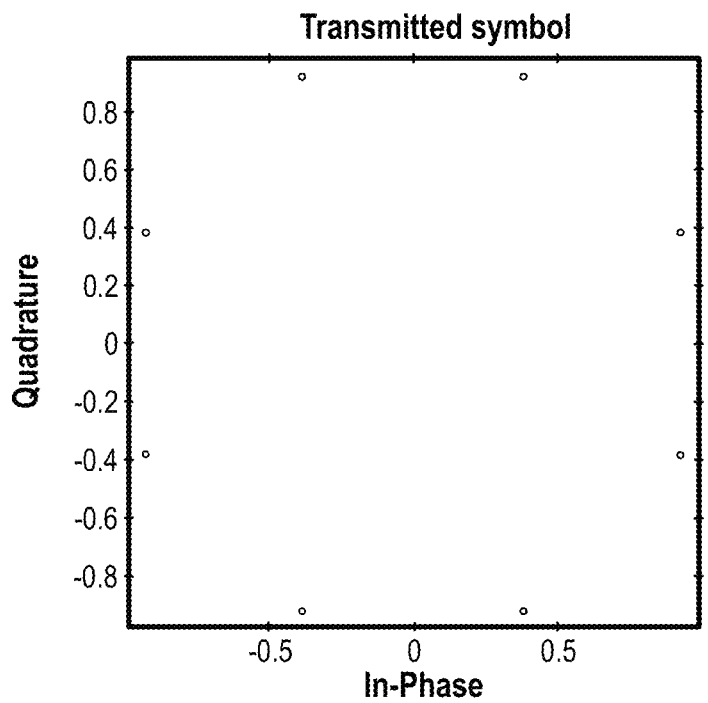
FIGS. 11A, 11B, and 11C illustrate constellation diagrams for transmitted symbols (FIG. 11A), where the signals are corrupted in the channel by noise (FIG. 11B) and decoded symbols (FIG. 11C) at a rate 1200 bps for signal received from a distance of 80 feet according to an example herein.
Figure 11B:
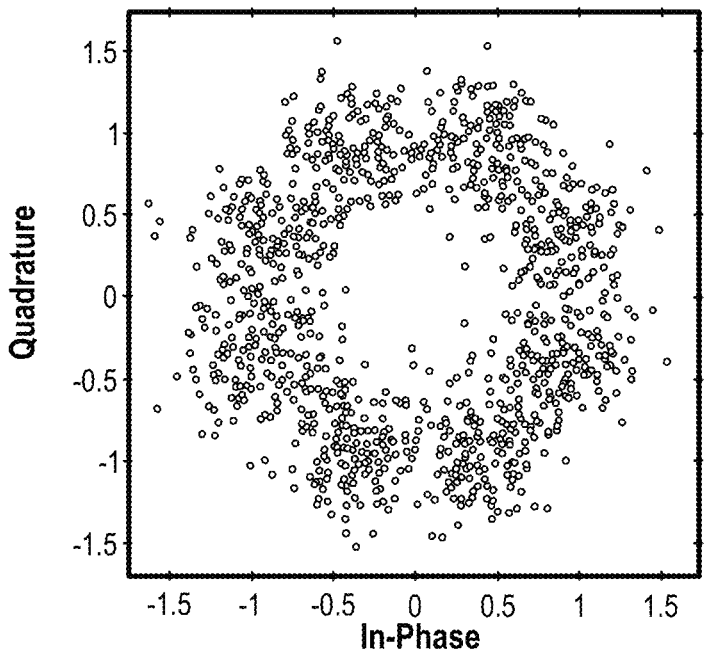
Figure 11C:
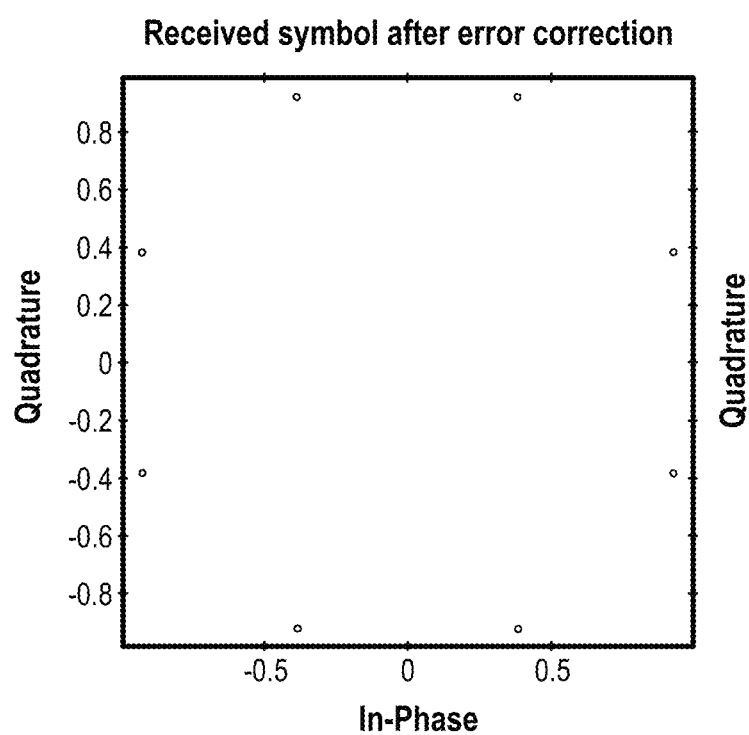

FIGS. 10A-10C and FIG. 11A-11C illustrate an example of DSSS-OFDM decoding signal recorded. Specifically. FIGS. 10A-10C illustrates a constellation diagram for transmitted symbols (FIG. 10A), where the signal is corrupted in the channel by noise (FIG. 10B) and decoded symbol (FIG. 10C) at rate 1200 bps for signal received from distance of 30 feet according to an example herein. And, FIGS. 11A-11C illustrates a constellation diagram for transmitted symbols (FIG. 11A), where the signals are corrupted in the channel by noise (FIG. 11B) and decoded symbols (FIG. 11C) at a rate 1200 bps for signal received from a distance of 80 feet according to an example herein. In these examples, the signal is modulated for M-Ary PSK and transmitted over noisy channel. The constellation graph shows M-Ary PSK modulated symbols for transmitted over orthogonal sub-carrier, and corruption of Transmitted symbol by noisy channel for various SNR, complete recovery of symbols after FEC error correction. Higher bit-rate achieved based on bandwidth availability for transmission and exceptional performance achieved in multi-path and lower SNR case.

FIGS. 12A-12D and FIGS. 13A-13D illustrate mean squared error (MSE) and symbol error rate (SER) achieved for various SNR considering different Q and bit rate for different microphones 1-4. The experimental results verified for distances from 5 cm up to 100 feet, assuming guard interval Tg=(Q/Bw) results in bandwidth efficiency depending on Carrier C and Q length of chip Code according to EQ. 22.

Figure 14:
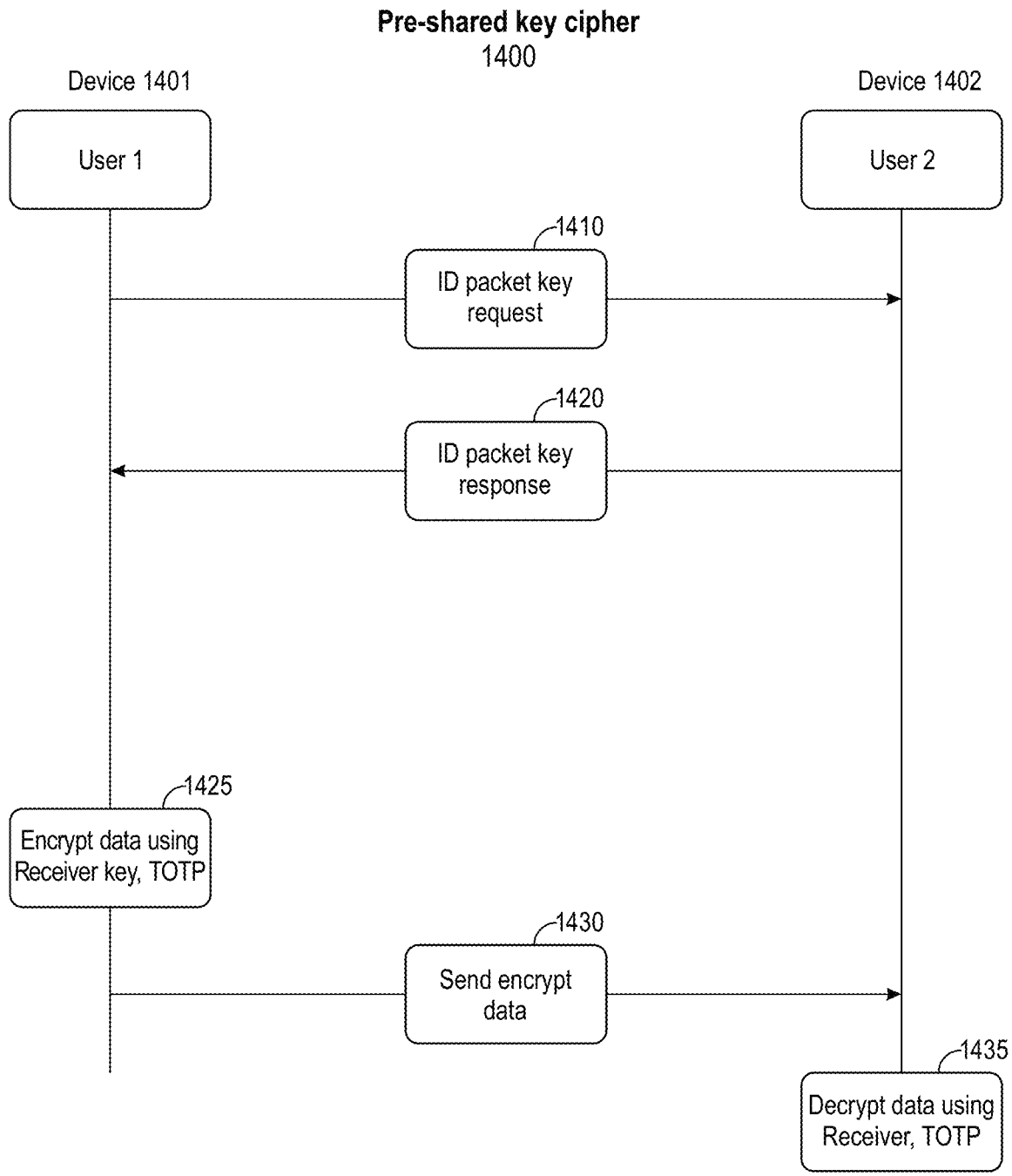
FIG. 14 illustrates two-way authentication with a pre-shared key cipher according to an example herein.
Figure 15:
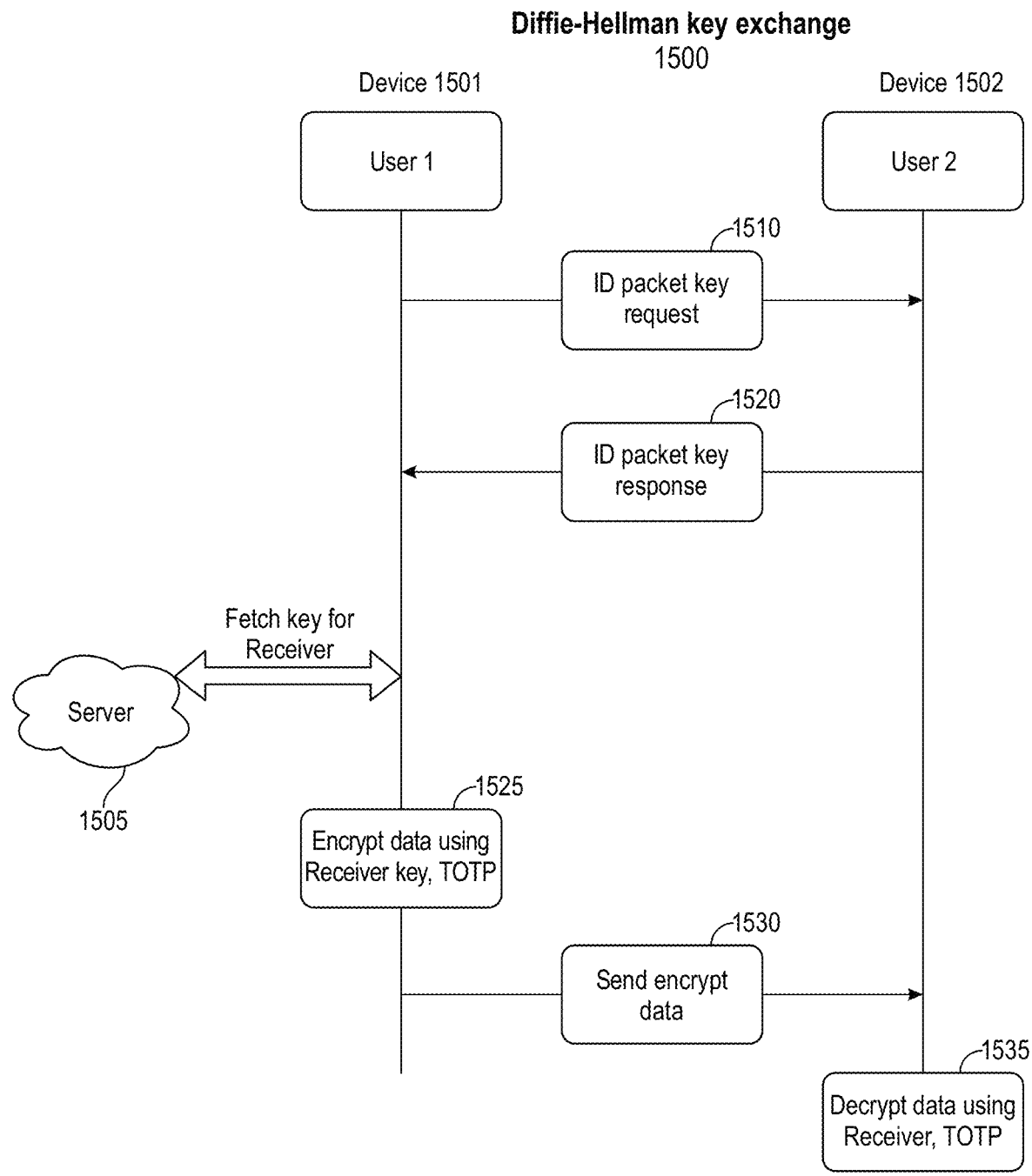
FIG. 15 illustrates two-way authentication with Diffie-Helman key exchange according to an example herein.

FIG. 14 and FIG. 15 illustrate two way authentication using pre-shared cipher and real time Diffie-Hellman key exchange protocol ensure secure channel creation for exchange of cryptographic key exchange across multiple users.

In FIG. 14, a real time pre-shared key cipher authentication method 1400 is used between two devices 1401 and 1402 operated by respective users 1 and 2. Devices 1401, 1402 can be any computing device having a transceiver operable in a near ultrasonic acoustic (audio) frequency range of a wireless communication network as described herein. Method 1400 includes sending an IP packet key request from device 1401 to device 1402 (step 1410). In step 1420, an ID packet key response is sent from device 1402 to device 1401. In step 1425, device 1401 encrypts data using the receiver key and authentication (such as a time-based one time password (TOTP)). In step 1430, device 1401 sends the encrypted data to device 1402. Device 1402 decrypts the encrypted data using its receiver key and TOTP (step 1435).

In FIG. 15, a real time Diffie-Hellman key exchange protocol method 1500 is used to ensure secure channel creation used between two devices 1501 and 1502 operated by respective users 1 and 2. Devices 1501, 1502 can be any computing device having a transceiver operable in a near ultrasonic acoustic (audio) frequency range of a wireless communication network as described herein. Method 1500 includes sending an IP packet key request from device 1501 to device 1502 (step 1510). In step 1520, an ID packet key response is sent from device 1502 to device 1501. In step 1525, device 1501 encrypts data using the receiver key 20) fetched from a server 1505 and authentication (such as a time-based one time password (TOTP)). In step 1530, device 1501 sends the encrypted data to device 1502. Device 1502 decrypts the encrypted data using its receiver key and TOTP (step 1535).

In an embodiment, a transceiver operable in a near ultrasonic acoustic (audio) frequency range of a wireless communication network. The transceiver includes a processor and a non-transitory machine-readable storage medium that is coupled to the processor, the non-transitory machine-readable storage medium containing instructions, which when executed by the processor, cause the processor to configure the transceiver to perform the method steps as disclosed in the detailed description of FIGS. 1-2.

The foregoing description of the specific examples will so fully reveal the general nature of the examples herein that others can, by applying current knowledge, readily modify and/or adapt for various applications such specific examples without departing from the generic concept, and, therefore, such adaptations and modifications should and are intended to be comprehended within the meaning and range of equivalents of the disclosed examples. It is to be understood that the phraseology or terminology employed herein is for the purpose of description and not of limitation. Therefore, while the examples herein have been described in terms of preferred examples, those skilled in the art will recognize that the examples herein can be practiced with modification within the spirit and scope of the examples.

EXAMPLE EMBODIMENTS

Embodiment 1. A method performed by a transceiver in a near ultrasonic acoustic (audio) frequency range of a wireless communication network, the method comprises: receiving a modulated data signal, wherein modulated signal generated from coupled Direct sequence spread spectrum DSSS and OFDM at transmitter; the PSK modulated data signal spread by different Q length chip sequence to ensure secure communication in lower SNR regime, according FIG. 1; and DSSS_OFDM demodulating the synchronized data signal by extracting each OFDM data blocks consisting data symbol, preamble, and postamble symbols which was transmitted on orthogonal sub-carrier with variable Q length chip sequence (spreading sequence) for multi-user communication over air as a transmission medium.

Embodiment 2. The method of Embodiment 1, wherein spread data sequence with variable chip sequence enables performance at different SNR and Multipath environment Embodiment 3. The method of any one of Embodiments 1-2, wherein spread data sequence with variable chip sequence enables multi-user communication simultaneously Embodiment 4. The method of any one of Embodiments 1-3, wherein spread data sequence is interleaved for frequency diversity robust algorithm for efficient computation.

Embodiment 5. A receiver operable in a near ultrasonic acoustic (audio) frequency range of a wireless communication network, the method comprises: unique channel estimator for real-time channel estimation FIG. 9 using single or multi Pilot; single pilot or multiple pilots are embedded in each OFDM block during encoding before transmission; and at the receiver end, these pilots are used to estimate and compensate for time varying channel with extremely low latency in computationally efficient manner for each OFDM block.

Embodiment 6. The method of Embodiment 5, wherein spread data sequence with variable chip length sequence is coupled with unique channel estimation using single or multiple pilot.

Embodiment 7. The method of any one of Embodiments 5-6, wherein real time channel estimation uses entire bandwidth in near ultrasonic acoustic (audio) communication.

Embodiment 8. The method of any one of Embodiments 5-6, wherein real time channel estimation uses single pilot with spreading to compensate for low-medium multipath distortion in channel.

Embodiment 9. The method of any one of Embodiments 5-6, wherein real time channel estimation uses multi pilot with spreading to compensate for any level of multipath distortion in the channel, including low multipath distortion to extremely high multipath distortion.

Embodiment 10. A method comprising: real Time Doppler Frequency estimation for entire bandwidth for each block, using a minimum MSE algorithm in each processing block, according to algorithm refer FIG. 6.

Embodiment 11. The method of Embodiment 10, wherein Doppler frequency shift is estimated from Minimum MSE. FIG. 7.

Figure 4B:
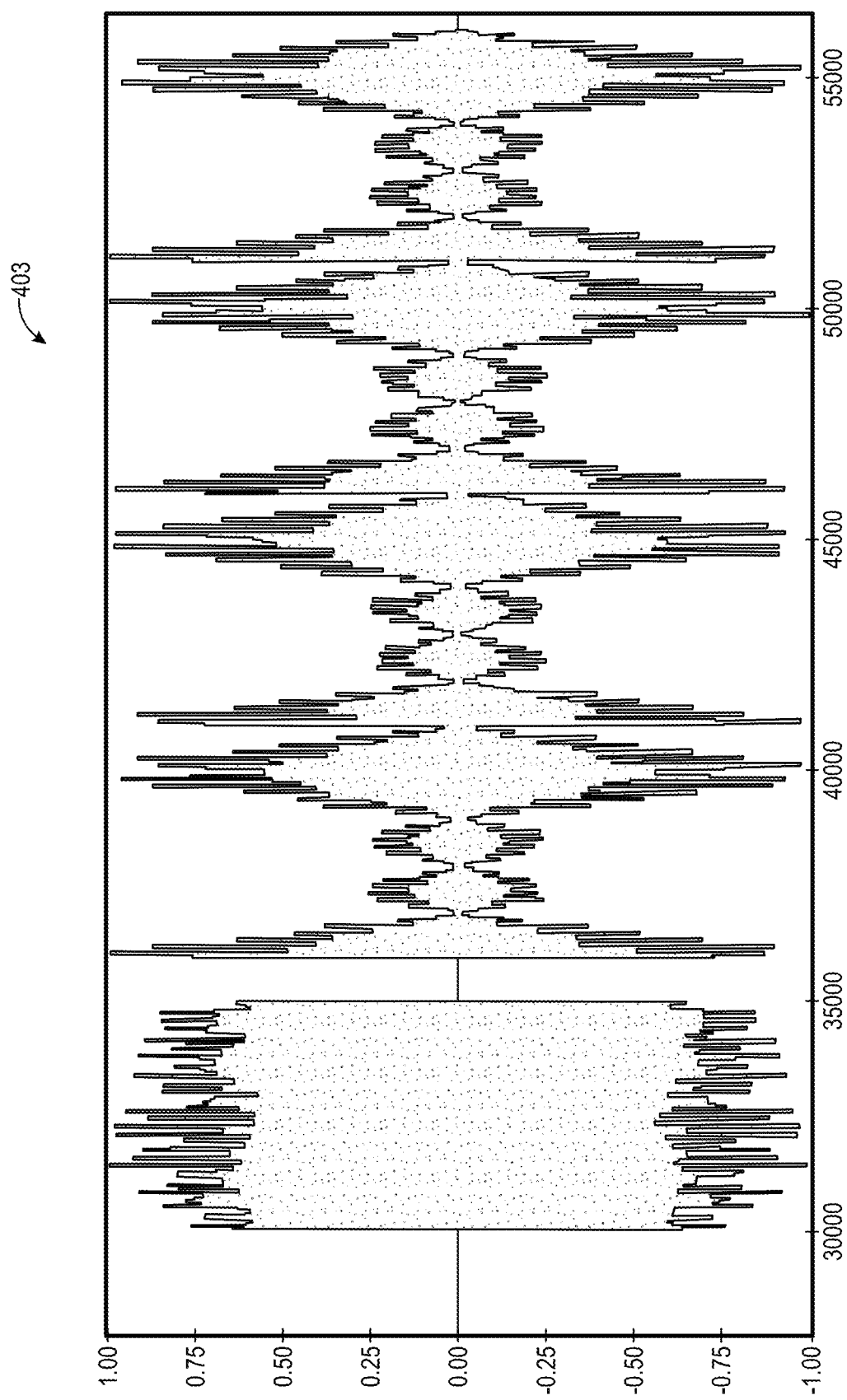
FIG. 4B is a diagram of a signal according to the data signaling frame of FIG. 4A.

Embodiment 12. A method comprising: protocol including Timing synchronization as Channel probe for coarse and fine timing synchronization to obtain accurate data start; and configuration selection as preamble and FEC encoded data including Single/Multi Pilot symbols FIG. 4.

Embodiment 13. The method of Embodiment 12, wherein the synchronization is achieved as described in FIG. 5

Embodiment 14. A method comprising: the near ultrasonic acoustic two way communication protocol can be used to communicate encrypted data for different authentication standards including but not limited to use cases in cyber security, device to device communication, user identification etc. refer FIG. 2.

Embodiment 15. The method of Embodiment 14, wherein transceiver exchange real-time dynamic data over sound waves connecting numerous smart devices without the need of additional hardware by making use of available microphone and speaker. The method also claims to use data form multiple microphones (if available) to enhance SNR and reduce the bit error. FIG. 12 and FIG. 13.

Embodiment 16. The method of any of Embodiments 14-15, wherein authentication performed by key exchange in real time using Diffie-Hellman key exchange protocol or by using pre-shared cipher key, or public private key cryptography for authentication. The authentication can be initiated with user biometrics for secure communication, refer FIG. 14 and FIG. 15.

Embodiment 17. The method of any of Embodiments 14-16, wherein DSSS-OFDM encrypted symbol transmission over sound used for authentication between a machine to person, person to person or machine to machine for TOTP authentication, Private public key authentication using Public key cryptography.

Embodiment 18. A method comprising: the embodiment supports full TCP protocol for organized data block transmission across devices over the network, ensuring successful end to end data delivery. The method breaks the data into OFDM blocks which aids in packet encoding to avoid resending the entire data in case of a high bit error during transmission.

Embodiment 19. A method performed by a transceiver in a near ultrasonic acoustic (audio) frequency range of a wireless communication network, the method comprises: receiving a modulated data signal generated from coupled direct sequence spread spectrum (DSSS) and orthogonal frequency division multiplexing (OFDM) at a transmitter, wherein the modulated data signal further comprises a phase-shift key (PSK) modulated data signal spread by different Q length chip sequence; and demodulating a synchronized data signal by extracting each OFDM data block having a data symbol and preamble and postamble symbols which were transmitted on an orthogonal sub-carrier with variable Q length chip sequence for multi-user communication over air as a transmission medium.

Embodiment 20. The method of Embodiment 19, wherein the demodulated synchronized data signal enables synchronization of communication over the air between transmitters and receivers in multiple user devices in the presence of multiple path propagation and different signal to noise ratios.

Embodiment 21. The method of Embodiment 19, wherein the demodulated synchronized data signal enables simultaneous communication over the air between transmitters and receivers in multiple user devices.

Embodiment 22. The method of any of Embodiments 19-21, wherein DSSS at the transmitter includes transmitting a spread data sequence interleaved for frequency diversity.

Embodiment 23. A method for receiving a modulated data signal at a receiver operable in a near ultrasonic acoustic (audio) frequency range of a wireless communication network, the method comprises: embedding a channel probe data field in a frame having one or more OFDM blocks during encoding before transmission by a transmitter to the receiver; and estimating channel equalization including extracting the data from the channel probe data field at the receiver to estimate and compensate for a time varying channel of data communication, whereby, each OFDM block can be processed with extremely low latency and in computationally efficient manner.

Embodiment 24. The method of Embodiment 23, wherein the transmitter transmits a spread data sequence with variable chip length sequence and is coupled with unique channel estimation using single or multiple pilot.

Embodiment 25. The method of any of Embodiments 23-24, wherein the estimating channel equalization uses an entire bandwidth in near ultrasonic acoustic (audio) communication.

Embodiment 26. The method of any of Embodiments 23-24, wherein the estimating channel equalization uses a single pilot with spreading to compensate for low-medium multipath distortion in a channel.

Embodiment 27. The method of any of Embodiments 23-24, wherein the estimating channel equalization uses multiple pilots with spreading to compensate for any level of multipath distortion in the channel, including low multipath distortion to extremely high multipath distortion.

Embodiment 28. The method of any of Embodiments 25-27, further comprising estimating Doppler frequency shift across an entire bandwidth for each OFDM block using a minimum mean square error algorithm in each processing block.

Embodiment 29. The method any of Embodiments 19-28, further comprising: encrypting data communicated in sound waves in near ultrasonic acoustic (audio) frequency range between the transmitter coupled to a speaker and the receiver coupled to a microphone.

Embodiment 30. The method any of Embodiments 19-29, wherein a transceiver exchanges real-time dynamic data over sound waves connecting numerous computing devices without the need of additional hardware by making use of available microphone and speaker on a computing device.

Embodiment 31. The method of claim 29, further comprising authenticating communication by performed a key exchange in real time using Diffie-Hellman key exchange protocol or by using pre-shared cipher key, or public private key cryptography for authentication.

Embodiment 32. The method any of Embodiments 19-31, wherein DSSS-OFDM encrypted symbol transmission over sound used for authentication can be between a machine to person, person to person or machine to machine for TOTP authentication or private public key authentication using public key cryptography.

Embodiment 33. The method any of Embodiments 19-32, further comprising using a TCP protocol for organized data block transmission across devices over the network to ensure guaranteed delivery of the data in the OFDM blocks which aids in packet encoding to avoid resending the entire data in case of a high bit error during transmission.

One or more illustrative embodiments incorporating the invention embodiments disclosed herein are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b." or, equivalently, "from approximately a to b." or, equivalently. "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method performed by a transceiver in a near ultrasonic acoustic (audio) frequency range of a wireless communication network, the method comprises:
   receiving a modulated data signal generated from coupled direct sequence spread spectrum (DSSS) and orthogonal frequency division multiplexing (OFDM) at a transmitter, wherein the modulated data signal further comprises a phase-shift key (PSK) modulated data signal spread by different Q length chip sequence; and
   demodulating a synchronized data signal by extracting each OFDM data block having a data symbol and preamble and postamble symbols which were transmitted on an orthogonal sub-carrier with variable Q length chip sequence for multi-user communication over air as a transmission medium.

2. The method of claim 1, wherein the demodulated synchronized data signal enables synchronization of communication over the air between transmitters and receivers in multiple user devices in the presence of multiple path propagation and different signal to noise ratios.

3. The method of claim 1, wherein the demodulated synchronized data signal enables simultaneous communication over the air between transmitters and receivers in multiple user devices.

4. The method of claim 1, wherein DSSS at the transmitter includes transmitting a spread data sequence interleaved for frequency diversity.

5. The method of claim 1, further comprising:
   encrypting data communicated in sound waves in near ultrasonic acoustic (audio) frequency range between the transmitter coupled to a speaker and a receiver coupled to a microphone.

6. The method of claim 1, wherein the transceiver exchanges real-time dynamic data over sound waves connecting numerous computing devices without the need of additional hardware by making use of available microphone and speaker on a computing device.

7. The method of claim 6, further comprising authenticating communication by performed a key exchange in real time using Diffie-Hellman key exchange protocol or by using pre-shared cipher key, or public private key cryptography for authentication.

8. The method of claim 1, wherein DSSS-OFDM encrypted symbol transmission over sound used for authentication can be between a machine to person, person to person or machine to machine for TOTP authentication or private public key authentication using public key cryptography.

\* \* \* \* \*